United States Patent
Ichikawa et al.

(10) Patent No.: US 11,476,790 B2
(45) Date of Patent: Oct. 18, 2022

(54) ELECTRIC WORKING MACHINE

(71) Applicant: MAKITA CORPORATION, Anjo (JP)

(72) Inventors: Yoshitaka Ichikawa, Anjo (JP); Akihiro Nakamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 412 days.

(21) Appl. No.: 16/715,560

(22) Filed: Dec. 16, 2019

(65) Prior Publication Data
US 2020/0212837 A1 Jul. 2, 2020

(30) Foreign Application Priority Data
Dec. 26, 2018 (JP) .............................. JP2018-242994

(51) Int. Cl.
*H02P 29/024* (2016.01)
*H02P 27/06* (2006.01)
(Continued)

(52) U.S. Cl.
CPC .......... *H02P 29/0241* (2016.02); *A01G 3/053* (2013.01); *A01G 3/062* (2013.01); *H02P 27/06* (2013.01); *B25F 5/02* (2013.01)

(58) Field of Classification Search
CPC ........ H02P 29/00; H02P 29/02; H02P 29/024; H02P 29/0241; H02P 29/60; H02P 29/68; H02P 27/00; H02P 27/04; H02P 27/06; H02P 21/00; H02P 21/0025; H02P 21/14; H02P 21/22; H02P 23/00; H02P 23/0031; H02P 23/14; H02P 23/28; H02P 25/062; H02P 8/34; H02P 7/00; H02P 6/00; H02P 6/12; H02P 6/28; H02P 6/32; H02P 1/00; H02P 1/04; H02P 1/163; H02P 1/18; H02P 1/24; H02P 1/42; H02P 1/46; H02P 3/00
See application file for complete search history.

(56) References Cited

U.S. PATENT DOCUMENTS 5,917,428 A * 6/1999 Discenzo ............. G01R 31/343
310/68 B
6,960,918 B2 * 11/2005 Hazelton ................ G01R 31/50
324/765.01

(Continued)

FOREIGN PATENT DOCUMENTS

JP 2010-058244 A 3/2010
JP 2016-22566 A 2/2016

OTHER PUBLICATIONS

May 31, 2022 Office Action issued in Japanese Patent Application No. 2018-242994.

*Primary Examiner* — Antony M Paul
(74) *Attorney, Agent, or Firm* — Oliff PLC

(57) ABSTRACT

An electric working machine in one aspect of the present disclosure includes two or more circuits and a control circuit. The control circuit executes two or more diagnoses one by one in order. The diagnoses at least include a first diagnosis and a second diagnosis. The first diagnosis diagnoses a first circuit. The second diagnosis diagnoses a second circuit. The control circuit executes the first diagnosis or the second diagnosis at a first diagnosis timing. The control circuit executes the first diagnosis or the second diagnosis at a second diagnosis timing. The second diagnosis timing follows the first diagnosis timing.

16 Claims, 19 Drawing Sheets

(51) Int. Cl.
*A01G 3/06* (2006.01)
*A01G 3/053* (2006.01)
*B25F 5/02* (2006.01)

(56) References Cited

U.S. PATENT DOCUMENTS

| | | | |
|---|---|---|---|
| 7,222,493 B2* | 5/2007 | Jayanth | F04B 51/00 |
| | | | 417/18 |
| 8,126,574 B2* | 2/2012 | Discenzo | G06Q 10/04 |
| | | | 700/28 |
| 2010/0063757 A1 | 3/2010 | Suzuki | |
| 2014/0300365 A1* | 10/2014 | Ziegler | G01R 31/367 |
| | | | 324/427 |
| 2016/0028344 A1 | 1/2016 | Kusakawa et al. | |

\* cited by examiner

| PRIORITY: HIGH | PRIORITY: LOW |
|---|---|
| 1ST DIAGNOSIS ITEM<br>2ND DIAGNOSIS ITEM | 3RD DIAGNOSIS ITEM<br>4TH DIAGNOSIS ITEM<br>5TH DIAGNOSIS ITEM<br>6TH DIAGNOSIS ITEM |

# ELECTRIC WORKING MACHINE

CROSS-REFERENCE TO RELATED APPLICATIONS

This application claims the benefit of Japanese Patent Application No. 2018-242994 filed on Dec. 26, 2018 with the Japan Patent Office, the entire disclosure of which is incorporated herein by reference.

BACKGROUND

The present disclosure relates to an electric working machine.

Japanese Unexamined Patent Application Publication No. 2010-058244 discloses an electric power tool provided with a self-diagnosis function of an analog-digital (A-D) converter.

SUMMARY

In an electric power tool, as the number of function circuits that perform self-diagnosis increases, reliability of the electric power tool increases, but the processing load for self-diagnosis increases. Such increase of the processing load can influence operation of the electric power tool.

In one aspect of the present disclosure, it is preferable that multiple function circuits can perform diagnoses efficiently in an electric working machine.

An electric working machine in one aspect of the present disclosure includes two or more circuits and/or a control circuit. The circuits at least include a first circuit and a second circuit. The circuits may execute functions different from each other. The control circuit executes two or more diagnoses one by one in order. The two or more diagnoses at least include a first diagnosis and a second diagnosis. The first diagnosis diagnoses the first circuit. The second diagnosis diagnoses the second circuit. The control circuit executes the first diagnosis or the second diagnosis at a first diagnosis timing. The control circuit executes the first diagnosis or the second diagnosis at a second diagnosis timing. The second diagnosis timing follows the first diagnosis timing. Each of the diagnoses may diagnose whether the circuits properly operate.

In the above-described electric working machine, the diagnoses are executed one by one in order. Moreover, the diagnosis executed at the second diagnosis timing is the same as or different from the diagnosis executed at the first diagnosis timing. Therefore, the diagnoses can be efficiently performed.

The control circuit may execute the diagnoses one by one according to a prescribed order. The prescribed order may be determined so that the first diagnosis is executed at the first diagnosis timing and the second diagnosis is executed at the second diagnosis timing. In the above-described electric working machine, the diagnoses can be efficiently performed according to the prescribed order.

Each of the diagnoses is associated with weighting. The prescribed order may be determined according to the weighting. In the above-described electric working machine, the diagnoses can be executed in the appropriate prescribed order according to the weighting.

The weighting associated with the first diagnosis may be greater than the weighting set to the second diagnosis. In this case, the prescribed order may be determined so that execution frequency of the first diagnosis is higher than execution frequency of the second diagnosis based on the weighting set to the first diagnosis and the weighting set to the second diagnosis. In other words, the greater the weighting is, the higher the execution frequency of each of the diagnoses may be. In the above-described electric working machine, the diagnoses can be efficiently executed at an appropriate frequency according to the weighting.

The control circuit may be configured to execute the first diagnosis at the first diagnosis timing. In this case, the control circuit may again execute the first diagnosis at the second diagnosis timing in response to the first diagnosis indicating that the first circuit is in a faulty (or failure) state. In the above-described electric working machine, the circuit diagnosed as in a faulty state is diagnosed preferentially to the other circuits. Therefore, reliability of the electric working machine can be improved.

The electric working machine may include an manipulator (or trigger, or operating device) configured such that a first operation is performed by a user of the electric working machine. The first diagnosis timing may correspond to a first timing. The first timing may be included in a first specific period. The first specific period may start in response to the user performing the first operation. The second diagnosis timing may correspond to a second timing. The second timing may be included in a second specific period. The second specific period may start in response to the user performing the first operation for the first time after an end of the first specific period. In the above-described electric working machine, the diagnoses can be executed at appropriate timings.

The control circuit may execute the first diagnosis at the first diagnosis timing. The control circuit may again execute the first diagnosis at the second diagnosis timing in response to the first diagnosis indicating that the first circuit is in a faulty state. In this case, the second diagnosis timing may correspond to a third timing. The third timing may be included in the second specific period. The third timing may be the same as or different from the second timing. In the above-described electric working machine, the circuit diagnosed as in a faulty state can be rediagnosed at an appropriate timing. Therefore, reliability of the electric working machine can be further improved.

The first timing may correspond to a timing after a start of the first specific period. In this case, the third timing may correspond to a start of the second specific period. In the above-described electric working machine, the first circuit indicated as in a faulty state in the first diagnosis is diagnosed earlier than a timing corresponding to the first timing in the second diagnosis timing. Therefore, reliability of the electric working machine can be further improved.

The first timing may correspond to an end of the first specific period. In the above-described electric working machine, the first circuit is diagnosed after elapse of the first specific period since the first operation is performed by the user. Therefore, if a failure (or faulty state) occurs to the first circuit in response to operation of the user during the first specific period, the failure can be quickly detected.

The electric working machine may further include a motor. The control circuit may not execute the first diagnosis at the first diagnosis timing in response to the motor being not driven during the first specific period. When the motor is not driven during the first specific period, it can be expected that a possibility of occurrence of a failure in the first circuit is low, as compared to a case where the motor is driven. Therefore, when the motor is not driven, the first diagnosis is not executed so as to efficiently diagnose the first circuit.

The electric working machine may further include a motor. The manipulator may include a first switch and a second switch provided separately from the first switch. The first switch and the second switch may be operated by the user. The control circuit may set the control circuit to a first state or a second state in response to operation of the second switch. The control circuit set to the first state may drive the motor in response to operation of the first switch. The control circuit set to a second state may be configured not to drive the motor even if the first switch is operated. The first operation may include the second switch being operated so that the control circuit is set to the first state.

In the above-described electric working machine, a timing when the motor is driven and a timing when the diagnosis is executed can be appropriately shifted. Therefore, reliability of the electric working machine can be improved.

The first specific period and the second specific period may end in response to the control circuit being set to the second state. In the above-described electric working machine, for example, when a failure occurs to the first circuit in response to operation of the user during the first specific period, the failure can be quickly detected.

The first specific period and the second specific period may end in response to elapse of a prescribed time without the first switch being operated after the control circuit is set to the first state. In the above-described electric working machine, even if a state where the first switch is not operated by the user continues after the control circuit is set to the first state, the diagnosis can be executed at an appropriate timing.

The control circuit may execute the first diagnosis at the first diagnosis timing. The first timing may correspond to a timing before the end of the first specific period. The control circuit may be configured not to drive the motor from when the first diagnosis indicates that the first circuit is in a faulty state until the end of the first specific period. In the above-described electric working machine, reliability of the electric working machine can be further improved.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Appearance of Electric Working Machine

Figure 1:
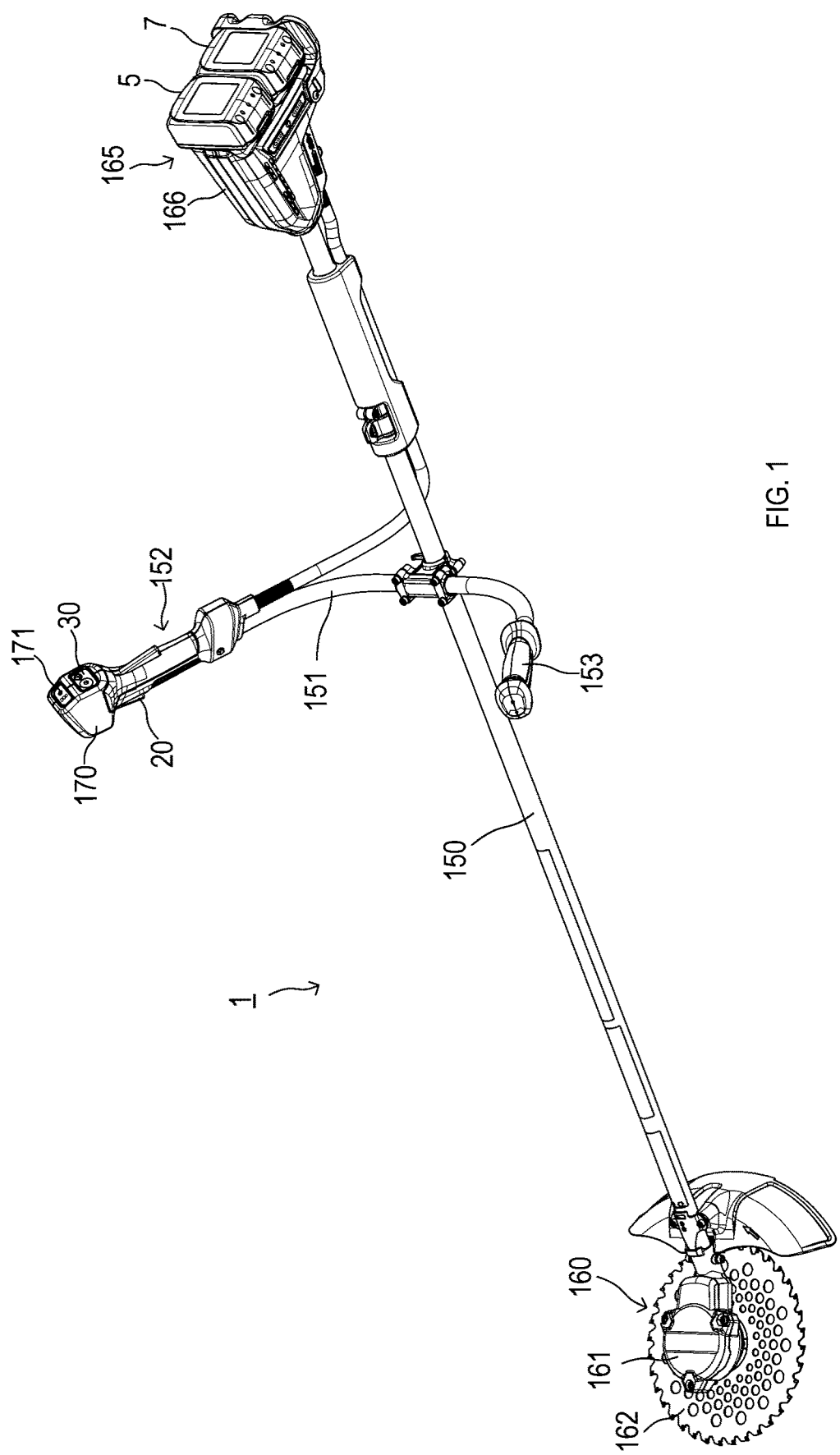
FIG. 1 is a perspective view of an electric working machine of an embodiment.

An electric working machine 1 shown in FIG. 1 is configured, for example, as a rechargeable bush/grass cutter. The rechargeable bush/grass cutter is used to cut bush/grass and small diameter trees. The electric working machine 1 includes a supporting pipe 150, a handle 151, a cutter 160, and a controller 165.

The supporting pipe 150 has a long cylindrical shape. The cutter 160 is provided at a first end of the supporting pipe 150. The controller 165 is provided at a second end of the supporting pipe 150.

The cutter 160 includes a housing 161. The housing 161 is fixed to the first end of the supporting pipe 150. The housing 161 houses a later-described motor 21 (see FIG. 2).

A rotary blade 162 can be attached to/detached from the housing 161. FIG. 1 shows the housing 161 with the rotary blade 162. The housing 161 is provided with a drive mechanism (not shown). The drive mechanism transmits rotation of the motor 21 to the rotary blade 162 attached thereto. When the motor 21 rotates, the rotary blade 162 rotates by a rotational driving force of the motor 21.

The controller 165 includes a housing 166. The housing 166 houses various circuits including a later-described control circuit 23 (see FIG. 2). A first battery pack 5 and a second battery pack 7 can be attached to/detached from the housing 166.

The handle 151 is provided substantially in the middle in a longitudinal direction of the supporting pipe 150. The handle 151 includes, for example, a U-shaped pipe. A first grip 152 is provided at a first end of the handle 151. A second grip 153 is provided at a second end of the handle 151. The first grip 152 is gripped, for example, with the right hand of a user of the electric working machine 1. The second grip 153 is gripped, for example, with the left hand of the user.

The first grip 152 is provided with a trigger operating device (or trigger, or manipulator) 20. The trigger operating device 20 is pulled by the user. Pulling is an operation to pull the trigger operating device 20 toward the first grip 152 with the finger or the like of the user. In other words, pulling is an operation to push the trigger operating device 20 into the first grip 152.

The trigger operating device 20 is biased in a release direction, which is opposite to a pulling direction, by an elastic member (not shown). As shown in FIG. 1, in a non-operation state where the trigger operating device 20 is not pulled by the user, most of the trigger operating device 20 protrudes from the first grip 152 due to a biasing force of the elastic member. When the trigger operating device 20 is pulled by the user, the trigger operating device 20 moves in the pulling direction (that is, toward the first grip 152) against the biasing force of the elastic member. The trigger operating device 20 moves in the pulling direction into the first grip 152.

The first grip 152 is further provided with an operation indicator 170. The operation indicator 170 includes a main power switch 30 and a display panel 171.

The main power switch 30 is operated by the user. The control circuit 23 to be described later enables (or turns on) or disables (or turns off) main operation (or main power) of the electric working machine 1 in response to operation of the main power switch 30.

The main power switch 30 of the present embodiment may be a so-called momentary switch, for example. The momentary switch is turned on while being pressed by the user, and is turned off when the user releases the switch. When the main power switch 30 is a momentary switch, the control circuit 23 may alternately enable or disable the main operation each time the main power switch 30 is pressed. This press-release operation includes pressing the main power switch 30 and releasing the main power switch 30.

The main power switch 30 can be any switch. The main power switch 30 may be a so-called alternate switch, for example. The alternate switch is turned on and off alternately each time the user presses the switch. When the main power switch 30 is an alternate switch, the control circuit 23 may enable the main operation when the main power switch 30 is ON, and may disable the main operation when the main power switch 30 is OFF. The main power switch 30 may be, for example, a slide switch.

The display panel 171 displays various information. The various information may include, for example, information indicating whether the main operation is enabled, information indicating various states of the electric working machine 1, and the like. The display panel 171 may include any display device. The display panel 171 may include, for example, a liquid crystal display, a LED, and the like.

2. Electrical Configuration of Electric Working Machine

Figure 2:
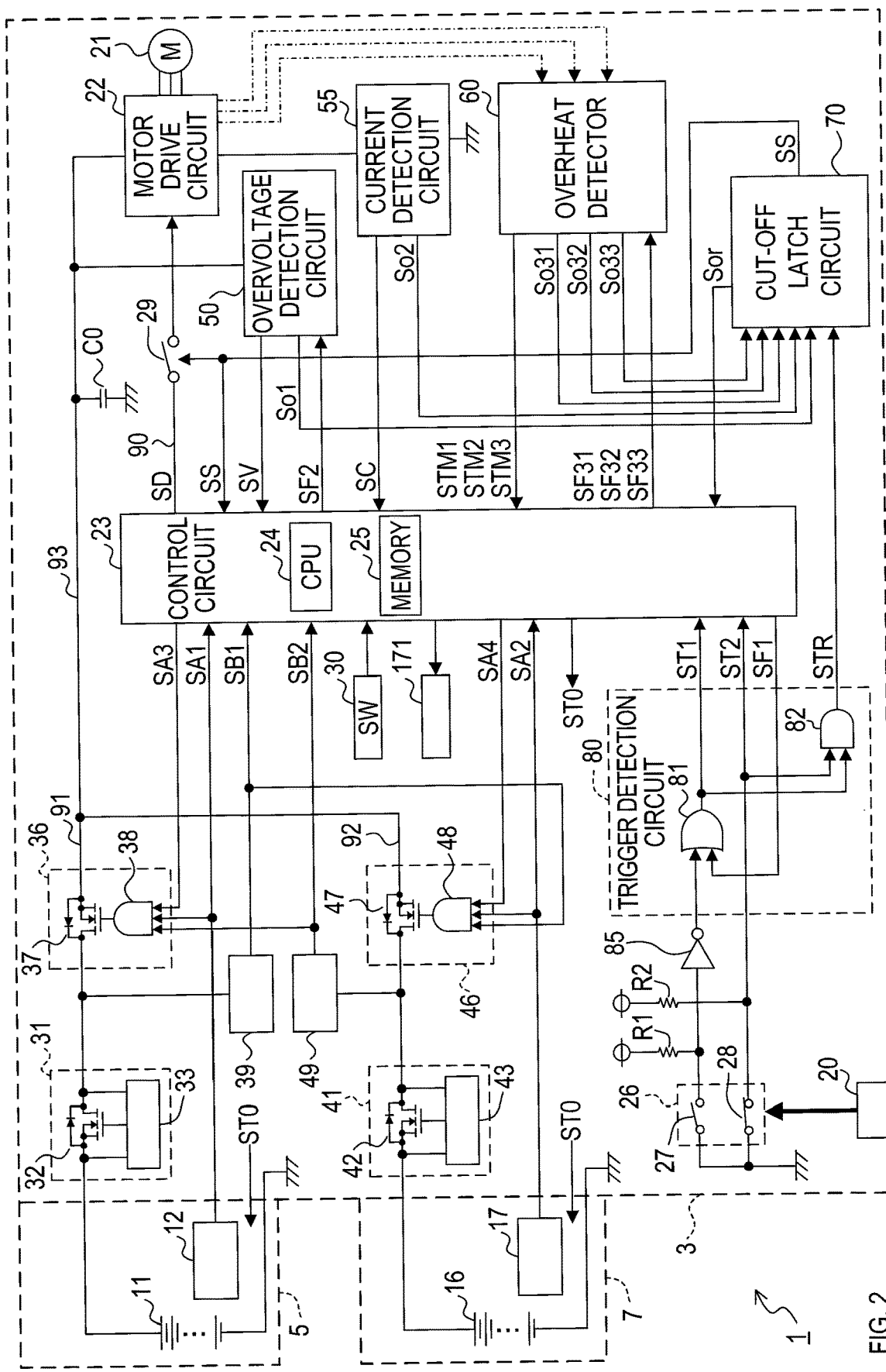
FIG. 2 is an explanatory diagram showing an electrical configuration of the electric working machine of the embodiment.
Figure 3:
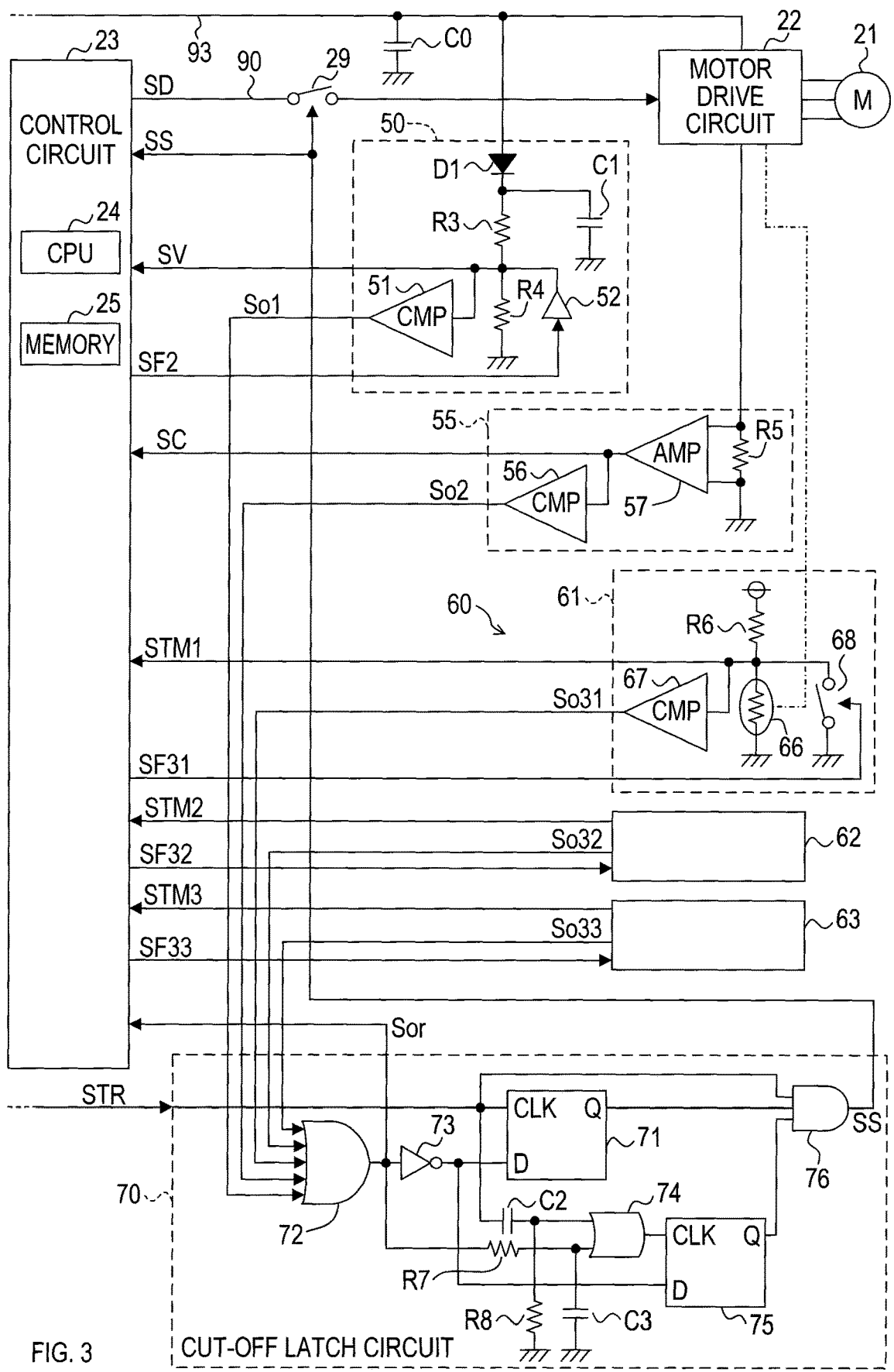
FIG. 3 is an explanatory diagram showing a part of the electric working machine shown in FIG. 2 in detail.

Referring to FIGS. 2 and 3, electrical configuration of the electric working machine 1 of the present embodiment will be described. FIG. 3 shows a portion of FIG. 2 (right side portion of the control circuit 23 in FIG. 2) in more detail. As shown in FIG. 2, the electric working machine 1 includes a main body 3, the first battery pack 5, and the second battery pack 7. In FIG. 2, for convenience of explanation, an assembly of various electrical components, various circuits, and the like provided in each part of the electric working machine 1 is referred to as the main body 3. The assembly includes the motor 21, various circuits in the housing 166, the trigger operating device 20 and the operation indicator 170.

The first battery pack 5 includes a battery 11 and a battery failure detection circuit 12. The battery 11 is, for example, a rechargeable battery. The battery 11 may be a primary battery.

The battery failure detection circuit 12 monitors the first battery pack 5. The battery failure detection circuit 12 outputs a first discharge permission signal SA1 when not detecting a failure (or a faulty state) of the first battery pack 5 for a specific discharge instruction period. The battery failure detection circuit 12, for example, may monitor a state of the battery 11. More specifically, the battery failure detection circuit 12 may determine whether the battery 11 has a failure, for example, based on a value of voltage of the battery 11, a value of electric current discharged from the battery 11 and/or temperature of the battery 11. The battery failure detection circuit 12, when determining that the battery 11 has no failure, may output the first discharge permission signal SA1 to indicate that the battery 11 has no failure. The battery failure detection circuit 12 when determining that the battery 11 has a failure, may not output the first discharge permission signal SA1 to indicate that the battery 11 has a failure.

The first battery pack 5 receives trigger detection information ST0 to be described later from the main body 3. The specific discharge instruction period may be, for example, a period during which a logic level of the trigger detection information ST0 is high, that is, a period during which the trigger operating device 20 is on-operated.

The second battery pack 7 includes a battery 16 and a battery failure detection circuit 17. The second battery pack 7 is configured in the same manner as the first battery pack 5. The battery failure detection circuit 17 outputs a second discharge permission signal SA2 when not detecting a failure of the second battery pack 7 during the specific discharge instruction period. The battery failure detection circuit 17 may, for example, monitor a state of the battery 16. More specifically, the battery failure detection circuit 17 may determine whether the battery 16 has a failure, for example, based on a value of voltage of the battery 16, a value of electric current discharged from the battery 16 and/or temperature of the battery 16. The battery failure detection circuit, when determining that the battery 16 has no failure, may output the second discharge permission signal SA2 to indicate that the battery 16 has no failure. The battery failure detection circuit 17, when determining that the battery 16 has a failure, may not output the second discharge permission signal SA2 to indicate that the battery 16 has a failure.

As shown in FIGS. 2 and 3, the main body 3 includes the trigger operating device 20, the motor 21, a motor drive circuit 22, the control circuit 23, the main power switch 30, a trigger switch 26, a trigger detection circuit 80, an overvoltage detection circuit 50, a first off detection circuit 39, a second off detection circuit 49, a current detection circuit 55, an overheat detector 60, a interruption latch circuit 70, and the display panel 171.

The main body 3 includes a power-supply circuit (not shown). The power-supply circuit receives a battery voltage from the first battery pack 5 or the second battery pack 7 attached to the electric working machine 1. The power-supply circuit generates a constant power-supply voltage based on the battery voltage, and outputs the power-supply voltage. The power-supply voltage is supplied to each portion of the main body 3 via a control power-supply line (not shown). Each portion of the main body 3 operates by the power-supply voltage supplied from the power-supply circuit.

The power-supply circuit may output the power-supply voltage when the battery voltage is supplied to the power-supply circuit, for example, regardless of whether the main operation is enabled or disabled. The power-supply circuit may output the power-supply voltage while the main operation is enabled.

The trigger switch 26 includes a first trigger switch 27 and a second trigger switch 28. The first trigger switch 27 and the second trigger switch 28 are turned on or off in conjunction with the user's operation of the trigger operating device 20.

The first trigger switch 27 is, for example, a normally open switch. The second trigger switch 28 is, for example, a normally closed switch. When the trigger operating device 20 is off-operated, the first trigger switch 27 is OFF, and the second trigger switch 28 is ON. When the trigger operating device 20 is on-operated, the first trigger switch 27 is ON and the second trigger switch 28 is OFF.

The main body 3 further includes a resistor R1, a resistor R2, and a logical negation (NOT) circuit 85. A first terminal of the first trigger switch 27 is connected to a ground line. A second terminal of the first trigger switch 27 is connected to an input terminal of the NOT circuit 85. The second terminal of the first trigger switch 27 is further connected to the control power-supply line via the resistor R1.

A first terminal of the second trigger switch 28 is connected to the ground line. A second terminal of the second trigger switch 28 is connected to the control circuit 23 via the trigger detection circuit 80. The second terminal of the second trigger switch 28 is further connected to the control power-supply line via the resistor R2.

The NOT circuit 85 receives a voltage of the second terminal of the first trigger switch 27 as a binary signal. The binary signal indicates a high or low logic level. The NOT circuit 85 inverts the logic level of the received binary signal and outputs the resulting signal.

More specific configuration of the trigger switch 26 will be described with reference to FIGS. 4A to 4C. The trigger switch 26 includes a switch box 100, a plunger 101, the first trigger switch 27, and the second trigger switch 28. The plunger 101 is connected to the trigger operating device 20, and works with the trigger operating device 20.

The first trigger switch 27 includes a first contact 121, a second contact 122, and a support spring 123. The first contact 121 is, for example, connected to the ground line. The second contact 122 is, for example, connected to the NOT circuit 85. The second contact 122 is configured to be rotatable around an axis of rotation (not shown). The support spring 123 biases the second contact 122 in a direction to contact the first contact 121.

The second trigger switch 28 includes a first electrode 111, a second electrode 112, a circuit board 113, and a brush 114. The brush 114 includes a conductor. The first electrode 111 and the second electrode 112 are provided on the circuit board 113. The brush 114 is provided on the plunger 101. The brush 114 is moved with the plunger 101. The first electrode 111 is, for example, connected to the ground line. The second electrode 112 is, for example, connected to the trigger detection circuit 80.

Figure 4A:
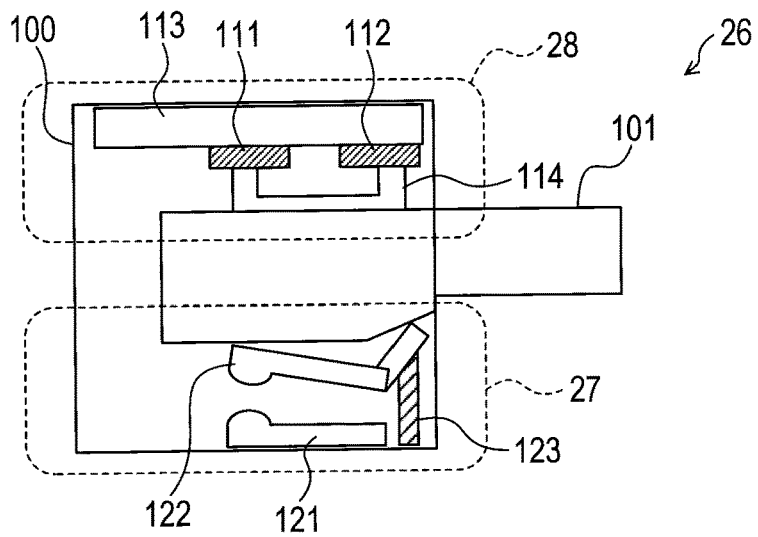
FIG. 4A is an explanatory diagram showing a trigger switch when a trigger operating device is not pulled.
Figure 4B:
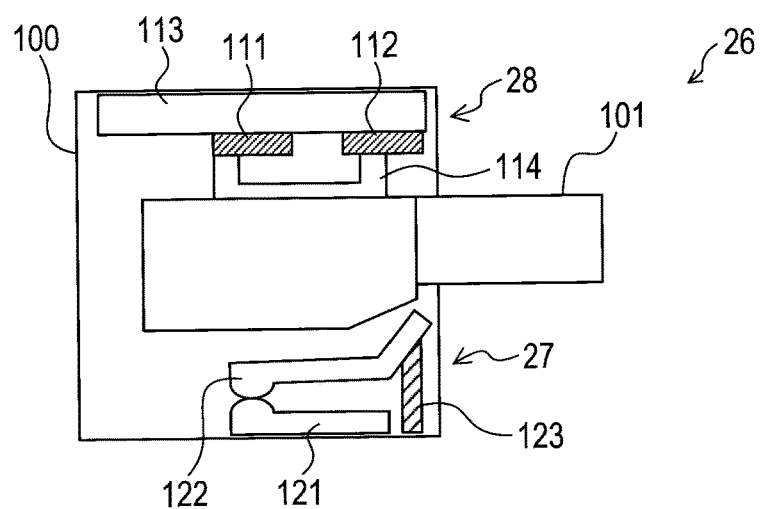
FIG. 4B is an explanatory diagram showing the trigger switch when the trigger operating device is pulled by a certain operation amount less than the maximum operation amount.
Figure 4C:
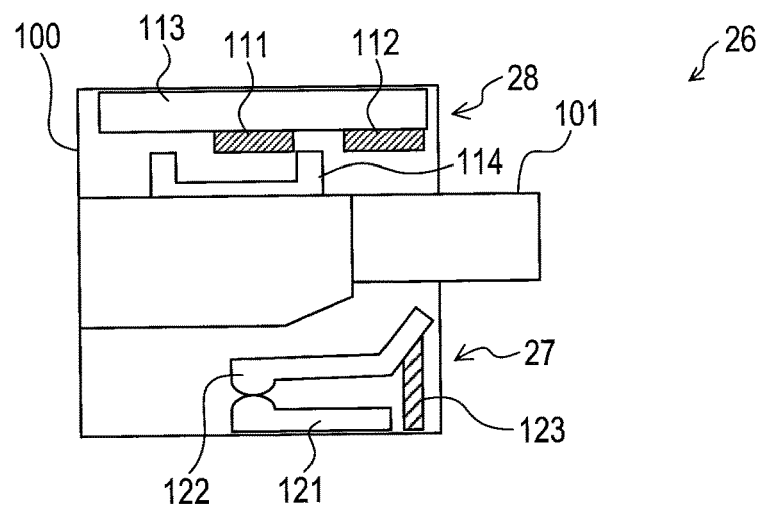
FIG. 4C is an explanatory diagram showing the trigger switch when the trigger operating device is pulled by the maximum operation amount.

The plunger 101 moves in a left direction in FIGS. 4A to 4C, that is, the aforementioned pulling direction, in response to the user pulling the trigger operating device 20. When the trigger operating device 20 is off-operated, the plunger 101 is supported at a position shown in FIG. 4A by a biasing force of a spring (not shown). That the trigger operating device 20 is off-operated includes that the user is not touching the trigger operating device 20. When the trigger operating device 20 is off-operated, the second contact 122 is rotationally moved in a direction away from the first contact 121 by the plunger 101 against a biasing force of the support spring 123. Therefore, the first trigger switch 27 is OFF.

When the trigger operating device 20 is off-operated, the first electrode 111 and the second electrode 112 are electrically connected via the brush 114 in the second trigger switch 28. Therefore, the second trigger switch 28 is ON.

When the user pulls the trigger operating device 20, the plunger 101 moves into the switch box 100. Along with this, in the second trigger switch 28, the brush 114 moves into the switch box 100. In the first trigger switch 27, the plunger 101 gradually moves away from the second contact 122, and then the second contact 122 approaches the first contact 121 by the biasing force of the support spring 123.

As the plunger 101 moves in the pulling direction, the second contact 122 contacts the first contact 121, for example, as shown in FIG. 4B. This turns on the first trigger switch 27. As the plunger 101 further moves in the pulling direction, the brush 114 moves away from the first electrode 111, as shown in FIG. 4C. This turns off the second trigger switch 28. The aforementioned on-operation means that, as illustrated in FIG. 4C, the trigger operating device 20 is pulled so that the first trigger switch 27 is turned on and the second trigger switch 28 is turned off. When the user releases the trigger operating device 20, the plunger 101 moves in the release direction with the trigger operating device 20 by the biasing force of the aforementioned elastic member, and returns to the position shown in FIG. 4A.

The trigger detection circuit 80 has a trigger detection function. The trigger detection function is a function to output information corresponding to a state of the trigger switch 26. Specifically, the trigger detection circuit 80 outputs a first trigger information ST1, a second trigger information ST2, and a trigger determination information STR.

The trigger detection circuit 80 receives an output signal of the NOT circuit 85. The trigger detection circuit 80 further receives a voltage of the second terminal of the second trigger switch 28, and a first pseudo signal SF1 outputted from the control circuit 23.

The voltage of second terminal of second trigger switch 28 inputted to the trigger detection circuit 80 is outputted to the control circuit 23 as the second trigger information ST2. The control circuit 23 outputs the first pseudo signal SF1 when executing a later-described trigger detection function diagnosis.

The first trigger information ST1, the second trigger information ST2, the trigger determination information STR, the signal received by the trigger detection circuit 80 from the NOT circuit 85, and the first pseudo signal SF1 are, for example, binary signals in the present embodiment.

The first trigger information ST1 basically indicates whether the first trigger switch 27 is ON. The second trigger information ST2 indicates whether the second trigger switch 28 is ON. Low logic level of the second trigger information ST2 indicates that the second trigger switch 28 is ON, that is, the trigger operating device 20 is off-operated. High logic level of the second trigger information ST2 indicates that the second trigger switch is OFF, that is, the trigger operating device 20 is on-operated.

The trigger detection circuit 80 includes a logical sum (OR) circuit 81 and a logical product (AND) circuit 82. The OR circuit 81 receives the output signal of the NOT circuit 85 and the first pseudo signal SF1.

Specifically, the first pseudo signal SF1 is a signal whose logic level is high. In other words, output of the first pseudo signal SF1 means that the logic level of first pseudo signal SF1 becomes high. Conversely, the logic level first pseudo signal SF1 becoming low means that the first pseudo signal SF1 is not outputted. Such correspondence between the logic level of the signal and an output state of the signal indicated by the logic level is the same for the aforementioned first discharge permission signal SA1 and the second discharge permission signal SA2, later-described third discharge permission signal SA3, fourth discharge permission signal SA4, first off detection signal SB1, second off detection signal SB2, overvoltage signal So1, overcurrent signal So2, first overheat signal So31, second overheat signal So32, third overheat signal So33, second pseudo signal SF2, third pseudo signal SF31, fourth pseudo signal SF32, and fifth pseudo signal SF33.

The OR circuit 81 calculates a logical sum of the two inputted signals and outputs the first trigger information ST1 indicating the calculation result. The first trigger information ST1 is inputted to the control circuit 23 and the AND circuit 82.

For example, assume that the first pseudo signal SF1 is not inputted to the OR circuit 81. In this case, the logic level of the first trigger information ST1 becomes low in response to off-operation of the trigger operating device 20, and becomes high in response to on-operation of the trigger operating device 20. That the logic level of the first trigger information ST1 and the logic level of the second trigger information ST2 are low indicates a trigger-off state. In the trigger-off state, the trigger operating device 20 is off-operated. That the logic level of the first trigger information ST1 and the logic level of the second trigger information ST2 are high indicates a trigger-on state. In the trigger-on state, the trigger operating device 20 is on-operated.

When the first pseudo signal SF1 is inputted to the OR circuit 81, the logic level of the first trigger information ST1 is high regardless of a state of the trigger operating device 20 (that is, regardless of a state of the first trigger switch 27). The control circuit 23, by inputting the first pseudo signal SF1 to the OR circuit 81, can set the first trigger information ST1 to be electrically equivalent to the state when the trigger operating device 20 is on-operated.

The AND circuit 82 receives the first trigger information ST1 and the second trigger information ST2. The AND circuit 82 calculates a logical product of the first trigger information ST1 and the second trigger information ST2, and outputs the trigger determination information STR indicating the calculation result. The trigger determination information STR is inputted to the interruption latch circuit 70. The trigger determination information STR whose logic level is low indicates a trigger-off state. The trigger determination information STR whose logic level is high indicates a trigger-on state.

The motor 21 receives motor drive power from the motor drive circuit 22 to be rotationally driven. When the motor 21 rotates, a rotational driving force of the motor 21 is transmitted to an output tool (not shown in FIG. 2) via the drive mechanism, and the output tool operates. The motor 21 of the present embodiment is, for example, a brushless motor.

The output tool is, for example, the aforementioned rotary blade 162 in the present embodiment. However, the output tool may be any tool. The output tool may be a tool that can process a workpiece by rotating, such as a drill bit, a driver bit, a rotation grinding stone, and a circular saw blade, for example. The output tool can be attached to/detached from the electric working machine 1. Rotation of the motor 21 may be converted into a linear motion and transmitted to the output tool.

The electric working machine 1 further includes a first power supply line 91, a second power supply line 92, and a main power supply line 93. A first end of the first power supply line 91 is connected to the first battery pack 5. The voltage of the battery 11 is supplied to the first end of the first power supply line 91. A second end of the first power supply line 91 is connected to a first end of the main power supply line 93.

A first end of the second power supply line 92 is connected to the second battery pack 7. The voltage of the battery 16 is supplied to the first end of the second power supply line 92. A second end of the second power supply line 92 is connected to the first end of the main power supply line 93.

A second end of the main power supply line 93 is connected to the motor drive circuit 22. A capacitor C0 is connected between the main power supply line 93 and the ground line.

Electric power of the battery 11 is supplied to the motor drive circuit 22 via the first power supply line 91 and the main power supply line 93. Electric power of the battery 16 is supplied to motor drive circuit 22 via the second power supply line 92 and the main power supply line 93.

The motor drive circuit 22 receives electric power of the battery 11 or electric power of the battery 16, as later described. In other words, the main power supply line 93 receives the voltage of the battery 11 or the voltage of the battery 16. The voltage of the battery 11 or the voltage of the battery 16 supplied to the main power supply line 93 is hereinafter, referred to as "input battery voltage".

The first power supply line 91 includes a first charging suppression circuit 31 and a first switching circuit 36.

The first switching circuit 36 includes a switch 37, and an AND circuit 38. The switch 37 completes (or establishes) or interrupts the first power supply line 91. When the switch 37 is turned on, a portion with the switch 37 in the first power supply line 91 is completed. When the switch 37 is turned off, the portion with the switch 37 in the first power supply line 91 is interrupted, and supply of electric power from the battery 11 to the motor 21 is interrupted.

The switch 37 is turned on when the logic level of the signal outputted from the AND circuit 38 is high. The switch 37 is turned off when the logic level of the signal outputted from the AND circuit 38 is low.

The switch 37 may be configured in any way. In the present embodiment, the switch 37 includes, for example, an n-channel Metal Oxide Semiconductor Field-Effect Transistor (MOSFET). Later-described switches 32, 42, 47 may be also configured in any way, and each include, for example, an n-channel MOSFET in the present embodiment.

The AND circuit 38 includes three signal input terminals. The three signal input terminals receive a first discharge permission signal SA1, a third discharge permission signal SA3 outputted from the control circuit 23, and a second off detection signal SB2. The second off detection signal SB2 is outputted from the second off detection circuit 49. The AND circuit 38 calculates a logical product of signals inputted to the signal input terminals, and outputs a signal indicating the calculation result to a gate of the switch 37.

The AND circuit 38 outputs a high-level signal when receiving the first discharge permission signal SA1, the third discharge permission signal SA3 and the second off detection signal SB2. The AND circuit 38 outputs a low-level signal when not receiving the first discharge permission signal SA1, the third discharge permission signal SA3 and/or the second off detection signal SB2.

The second off detection circuit 49, as later described, outputs the second off detection signal SB2 when the switch 42 of the second charging suppression circuit 41 and the switch 47 of the second switching circuit 46 are OFF. When the switch 42 and/or the switch 47 are ON, the second off detection signal SB2 is not outputted. Therefore, for example, when the switch 47 is turned on, the second off detection signal SB2 is not inputted to the AND circuit 38. In this case, the output of the AND circuit 38 has low logic level and the switch 37 is turned off. This suppresses simultaneous turning-on of the switches 37, 47.

The first charging suppression circuit 31 includes the switch 32 and a synchronous rectifier circuit 33. The switch 32 completes or interrupts the first power supply line 91. When the switch 32 is turned on, a portion with the switch 32 of the first power supply line 91 is completed. When the switch 32 is turned off, the portion with the switch 32 of the first power supply line 91 is interrupted. The switch 32 is turned on or off by the synchronous rectifier circuit 33.

A gate of the switch 32 is connected to the synchronous rectifier circuit 33. A source of the switch 32 is connected to the first battery pack 5 and to the synchronous rectifier circuit 33. A drain of the switch 32 is connected to a drain of the switch 37.

The synchronous rectifier circuit 33 turns on or off the switch 32 based on a voltage between the source and the drain of the switch 32. Specifically, when a discharge current from the first battery pack 5 flows to a parasitic diode existing between the source and the drain of the switch 32, the synchronous rectifier circuit 33 detects the discharge current and turns on the switch 32. The synchronous rectifier circuit 33, when detecting that the discharge from the first battery pack 5 is stopped or a charging current is supplied to the first battery pack 5 via the first power supply line 91 while the switch 32 is ON, turns of the switch 32. Due to such configuration, when electric current flows from the main body 3 to the battery 11, the switch 32 is turned off to interrupt the electric current, and charging of the battery 11 is suppressed or avoided. More specifically, the synchronous rectifier circuit 33 controls a gate voltage of the switch 32 so that a voltage value between the drain and the source of the switch 32 is a specified voltage value (about 30 mV, for example).

The second power supply line 92 includes the second charging suppression circuit 41 and the second switching circuit 46.

The second switching circuit 46 includes the switch 47 and an AND circuit 48. The switch 47 completes or interrupts the second power supply line 92. When the switch 47 is turned on, a portion with the switch 47 of the second power supply line 92 is completed. When the switch 47 is turned off, the portion with the switch 47 of the second power supply line 92 is interrupted, and supply of electric power from the battery 16 to the motor 21 is interrupted.

The switch 47 is turned on when the logic level of the signal outputted from the AND circuit 48 is high. The switch 47 is turned off when the logic level of the signal outputted from the AND circuit 48 is low.

The AND circuit 48 includes three signal input terminals. The signal input terminals in the AND circuit 48 receive the second discharge permission signal SA2, the fourth discharge permission signal SA4, and the first off detection signal SB1. The first off detection signal SB1 is outputted from the first off detection circuit 39. The AND circuit 48 calculates a logical product of signals outputted from the signal input terminals, and outputs a signal indicating the calculation result to the gate of the switch 47.

The AND circuit 48 outputs a high-level signal when receiving the second discharge permission signal SA2, the fourth discharge permission signal SA4 and the first off detection signal SB1. The AND circuit 48 outputs a low-level signal when the second discharge permission signal SA2, the fourth discharge permission signal SA4 and/or the first off detection signal SB1 is not inputted.

The first off detection circuit 39, as later described, outputs the first off detection signal SB1 when the switch 32 of the first charging suppression circuit 31 and the switch 37 of the first switching circuit 36 are OFF. When the switch 32 and/or the switch 37 are turned on, the first off detection signal SB1 is not outputted. Therefore, for example, when the switch 37 is turned on, the first off detection signal SB1 is not inputted to the AND circuit 48. In this case, output of the AND circuit 48 has low logic level and the switch 47 is turned off. This suppresses simultaneous turning-on of the switches 37, 47.

The second charging suppression circuit 41 includes the switch 42 and a synchronous rectifier circuit 43. The switch 42 completes or interrupts the second power supply line 92. When the switch 42 is turned on, a portion with the switch 42 of the second power supply line 92 is completed. When the switch 42 is turned off, the portion with the switch 42 of the second power supply line 92 is interrupted. The switch 42 is turned on or off by the synchronous rectifier circuit 43.

A gate of the switch 42 is connected to the synchronous rectifier circuit 43. A source of the switch 42 is connected to the second battery pack 7 and to the synchronous rectifier circuit 43. A drain of the switch 42 is connected to a drain of the switch 47.

The synchronous rectifier circuit 43 turns on or off the switch 42 based on a voltage between the source and the drain of the switch 42. Specifically, when a discharge current from the second battery pack 7 flows to a parasitic diode existing between the source and the drain of the switch 42, the synchronous rectifier circuit 43 detects the discharge current and turns on the switch 42. The synchronous rectifier circuit 43, when detecting that the discharge from the second battery pack 7 is stopped or a charging current is supplied to the second battery pack 7 via the second power supply line 92 while the switch 42 is ON, turns off the switch 42. Due to such configuration, when electric current flows from the main body 3 to the battery 16, the switch 42 is turned off to interrupt the electric current, and charging of the battery 16 is suppressed or avoided. More specifically, the synchronous rectifier circuit 43 controls a gate voltage of the switch 42 so that a voltage value between the drain and the source of the switch 42 is a specified voltage value (about 30 mV, for example).

The first off detection circuit 39 receives a voltage between the first charging suppression circuit 31 and the first switching circuit 36 in the first power supply line 91. The first off detection circuit 39 detects that the switch 32 and the switch 37 are turned off. The first off detection circuit 39 outputs the first off detection signal SB1 (high-level signal) when the switch 32 and the switch 37 are turned off. The first off detection circuit 39 does not output the first off detection signal SB1 when the switch 32 and/or the switch 37 is turned on. In this case, an output port of the first off detection signal SB1 in the first off detection circuit 39 has low logic level.

The second off detection circuit 49 receives a voltage between the second charging suppression circuit 41 and the second switching circuit 46 in the second power supply line 92. The second off detection circuit 49 detects that the switch 42 and the switch 47 are turned off. The second off detection circuit 49 outputs the second off detection signal SB2

(high-level signal) when the switch 42 and the switch 47 are turned off. The second off detection circuit 49 does not output the second off detection signal SB2 when the switch 42 and/or the switch 47 is turned on. In this case, an output port of the second off detection signal SB2 in the second off detection circuit 49 has low logic level.

The motor drive circuit 22 converts electric power (hereinafter, "battery power") supplied from the first battery pack 5 or the second battery pack 7 to the aforementioned motor drive power, and supplies the motor drive power to the motor 21. The motor drive power is, for example, three-phase power.

Specifically, the motor drive circuit 22 of the present embodiment includes, for example, an inverter (not shown). The inverter includes a U-phase switch pair, a V-phase switch pair and a W-phase switch pair connected to each other in parallel. Each of the U-phase switch pair, the V-phase switch pair and the W-phase switch pair includes two semiconductor switching elements connected in series. In other words, the motor drive circuit 22 includes six semiconductor switching elements.

The U-phase switch pair, the V-phase switch pair and the W-phase switch pair are connected to the motor 21. The U-phase switch pair supplies a U-phase voltage to the motor 21. The U-phase voltage is a voltage at a connection point of the two semiconductor switching elements connected in series in the U-phase switch pair. The V-phase switch pair supplies a V-phase voltage to the motor 21. The V-phase voltage is a voltage at a connection point of the two semiconductor switching elements connected in series in the V-phase switch pair. The W-phase switch pair supplies a W-phase voltage to the motor 21. The W-phase voltage is a voltage at a connection point of the two semiconductor switching elements connected in series in the W-phase switch pair.

The motor drive circuit 22 is connected to the control circuit 23 via a drive line 90. The motor drive circuit 22 receives a motor drive command SD from the control circuit 23 via the drive line 90. The motor drive circuit 22, when receiving the motor drive command SD, turns on or off the six semiconductor switching elements in accordance with the motor drive command SD. This generates motor drive power including the aforementioned U-phase voltage, V-phase voltage and W-phase voltage.

The drive line 90 includes an interruption switch 29. The interruption switch 29 completes or interrupts the drive line 90. When the interruption switch 29 is turned on, the motor drive command SD outputted from the control circuit 23 is inputted to the motor drive circuit 22 via the interruption switch 29. When the interruption switch 29 is turned off, transmission of the motor drive command SD from the control circuit 23 to the motor drive circuit 22 is interrupted.

The interruption switch 29 is turned on or off in accordance with interruption information SS outputted from the interruption latch circuit 70. The interruption switch 29 is turned on when the logic level of the interruption information SS is high. The interruption switch 29 is turned off when the logic level of the interruption information SS is low. The interruption information SS whose logic level is high indicates command permission. The interruption information SS whose logic level is low indicates command interruption.

The interruption switch 29 may be configured in any way. The interruption switch 29 may include, for example, a MOSFET.

The overvoltage detection circuit 50, the current detection circuit 55, and the overheat detector 60 are provided to detect five failure states (faulty states). The five failure states include an overvoltage state, an overcurrent state, a U-phase overheated state, a V-phase overheated state, and a W-phase overheated state.

The overvoltage state indicates, for example, a state where an input battery voltage value is higher than a prescribed normal voltage range. The input battery voltage value is a value of the input battery voltage supplied to the motor drive circuit 22 via the main power supply line 93.

The overcurrent state indicates, for example, a state where a motor current value is higher than a prescribed normal current range. The motor current value is a value of electric current supplied to the motor 21 via the motor drive circuit 22.

The U-phase overheated state indicates, for example, a state where a later-described U-phase temperature is higher than a prescribed normal temperature range. The V-phase overheated state indicates, for example, a state where a later-described V-phase temperature is higher than the prescribed normal temperature range. W-phase overheated state indicates, for example, a state where a later-described W-phase temperature is higher than the prescribed normal temperature range.

The overvoltage detection circuit 50, the current detection circuit 55, and the overheat detector 60, as later described, detect corresponding failure states not by software processing based on a program (computer program) but by hardware processing.

The overvoltage detection circuit 50 detects the input battery voltage value, and outputs information based on the detected input battery voltage value. Specifically, the overvoltage detection circuit 50 outputs a voltage signal SV. The voltage signal SV is an analog signal indicating the input battery voltage value.

The overvoltage detection circuit 50 further has a function to detect the overvoltage state. Specifically, the overvoltage detection circuit 50 outputs the overvoltage signal So1 when the input battery voltage value is, for example, equal to or more than a first voltage threshold. The overvoltage signal So1 indicates generation of the overvoltage state. The first voltage threshold may be, for example, a higher value than the aforementioned normal voltage range.

The overvoltage detection circuit 50 receives the second pseudo signal SF2 from the control circuit 23. The control circuit 23 outputs the second pseudo signal SF2 when executing a later-described overvoltage protection function diagnosis.

The overvoltage detection circuit 50 may be configured, for example, as shown in FIG. 3. As shown in FIG. 3, the overvoltage detection circuit 50 includes a comparator 51, a buffer 52, resistors R3, R4, a capacitor C1, and a diode D1. An anode of the diode D1 is connected to the main power supply line 93. A cathode of the diode D1 is connected to a first terminal of the resistor R3. A second terminal of the resistor R3 is connected to a first terminal of the resistor R4. A second terminal of the resistor R4 is connected to the ground line. A first terminal of the capacitor C1 is connected to the cathode of the diode D1. A second terminal of the capacitor C1 is connected to the ground line. The circuit including the diode D1 and the capacitor C1 functions as a so-called peak hold circuit.

A voltage at a connection point of the resistor R3 and the resistor R4 (that is, voltage of the first terminal of the resistor R4) is outputted to the control circuit 23 as the voltage signal SV. The voltage at the connection point of the resistor R3 and the resistor R4 is further inputted to the comparator 51. The comparator 51 is configured not to output the overvoltage signal So1 when the input battery voltage value is lower than the first voltage threshold, and to output the overvoltage signal So1 when the input battery voltage value is equal to or higher than the first voltage threshold.

The buffer 52 receives the second pseudo signal SF2. An output signal of the buffer 52 is inputted to the comparator 51. A voltage value of the second pseudo signal SF2 is a value that enables output of the overvoltage signal So1 from the comparator 91 when the overvoltage detection circuit 50 operates properly. The comparator 51 outputs the overvoltage signal So1 in response to receiving the second pseudo signal SF2. Therefore, when the overvoltage detection circuit 50 operates properly, the overvoltage detection circuit 50 outputs the overvoltage signal So1 in response to receiving the second pseudo signal SF2 even if the overvoltage state is not actually generated. The second pseudo signal SF2 is a signal for generating a pseudo overvoltage state.

The current detection circuit 55 detects the motor current value, and outputs information based on the detected motor current value. Specifically, the current detection circuit 55 outputs a current signal SC. The current signal SC is an analog signal indicating the motor current value.

The current detection circuit 55 further has a function to detect the overcurrent state. Specifically, the current detection circuit 55 outputs an overcurrent signal So2 when the motor current value is, for example, equal to or higher than the first current threshold. The overcurrent signal So2 indicates generation of the overcurrent state. The first current threshold may be, for example, higher than the aforementioned normal current range.

The current detection circuit 55 may be, for example, configured as shown in FIG. 3. As shown in FIG. 3, the current detection circuit 55 includes an amplifier circuit 57, a comparator 56, and a resistor R5. The resistor R5 is provided in a current path through which the motor current flows. Accordingly, a voltage corresponding to a value of the motor current is generated across the resistor R5. The amplifier circuit 57 amplifies the voltage across the resistor R5.

The voltage amplified by the amplifier circuit 57 is outputted to the control circuit 23 as the current signal SC. The voltage amplified by the amplifier circuit 57 is further inputted to the comparator 56. The comparator 56 does not output the overcurrent signal So2 when the motor current value is lower than the first current threshold. The comparator 56 outputs the overcurrent signal So2 when the motor current value is equal to or higher than the first current threshold.

The overheat detector 60 detects the temperature of the motor drive circuit 22. More specifically, the overheat detector 60 includes a first overheat detection circuit 61, a second overheat detection circuit 62, and a third overheat detection circuit 63, as shown in FIG. 3.

The first overheat detection circuit 61 detects the temperature of the U-phase switch pair (hereinafter, "U-phase temperature") in the motor drive circuit 22. Specifically, the U-phase temperature may be, for example, one of the temperatures of the two semiconductor switching elements included in the U-phase switch pair. The U-phase temperature may be, for example, one of the temperatures of the two semiconductor switching elements with the longer on period.

The first overheat detection circuit 61 outputs information based on the detected U-phase temperature. Specifically, the first overheat detection circuit 61 outputs a first temperature signal STM1. The first temperature signal STM1 is an analog signal indicating the U-phase temperature.

The first overheat detection circuit 61 further has a function to detect the U-phase overheated state. Specifically, the first overheat detection circuit 61 outputs the first overheat signal So31 when the U-phase temperature is equal to or higher than a first U-phase temperature threshold. The first overheat signal So31 indicates generation of the U-phase overheated state. The first U-phase temperature threshold may be, for example, higher than the aforementioned normal temperature range.

The first overheat detection circuit 61 receives the third pseudo signal SF31 from the control circuit 23. The control circuit 23 outputs the third pseudo signal SF31 when a later-described first overheat protection function diagnosis is executed.

The first overheat detection circuit 61 may be, for example, configured as shown in FIG. 3. As shown in FIG. 3, the first overheat detection circuit 61 includes a temperature detection element 66, a comparator 67, a switch 68, and a resistor R6. The temperature detection element 66 is provided at or near a detection target for the aforementioned U-phase temperature so as to be able to detect the U-phase temperature. In the present embodiment, the temperature detection element 66 may be, for example, an NTC thermistor having negative resistance temperature characteristics.

A first terminal of the resistor R6 is connected to the control power-supply line. A second terminal of the resistor R6 is connected to a first terminal of the temperature detection element 66. A second terminal of the temperature detection element 66 is connected to the ground line. A first terminal of the switch 68 is connected to a connection point of the resistor R6 and the temperature detection element 66 (that is, first terminal of the temperature detection element 66). A second terminal of the switch 68 is connected to the ground line.

A voltage at the connection point of the resistor R6 and the temperature detection element 66 is outputted to the control circuit 23 as the first temperature signal STM1. The voltage at the connection point of the resistor R6 and the temperature detection element 66 is further inputted to comparator 67. The comparator 67 is configured not to output the first overheat signal So31 when the U-phase temperature is lower than the first U-phase temperature threshold, and to output the first overheat signal So31 when the U-phase temperature is equal to or higher than the first U-phase temperature threshold.

The switch 68 is normally off when no third pseudo signal SF31 is inputted to the first overheat detection circuit 61. While third pseudo signal SF3 is inputted to the first overheat detection circuit 61, the switch 68 is ON. When the switch 68 is turned on, a value of voltage inputted to the comparator 67 becomes substantially 0 V. In this case, if the first overheat detection circuit 61 operates properly, the first overheat signal So31 is outputted from the comparator 67. In other words, when the third pseudo signal SF31 is inputted to the first overheat detection circuit 61, the U-phase overheated state is generated in a pseudo manner even if the U-phase overheated state is not actually generated.

In the present embodiment, the second overheat detection circuit 62 and the third overheat detection circuit 63 are configured in the same manner as the first overheat detection circuit 61 except for the position of the temperature detection element 66.

The second overheat detection circuit 62 detects the temperature of V-phase switch pair (hereinafter, "V-phase temperature") in the motor drive circuit 22. The V-phase temperature may be, for example, one of temperatures of the two semiconductor switching elements included in the V-phase switch pair, as in the U-phase temperature. The second overheat detection circuit 62 outputs a second temperature signal STM2 which is an analog signal indicating the detected V-phase temperature.

The second overheat detection circuit 62 further has a function to detect the V-phase overheated state. Specifically, the second overheat detection circuit 62 outputs a second overheat signal So32 when the V-phase temperature is, for example, equal to or higher than the first V-phase temperature threshold. The second overheat signal So32 indicates generation of the V-phase overheated state. The first V-phase temperature threshold may be, for example, higher than the aforementioned normal temperature range.

The second overheat detection circuit 62 receives a fourth pseudo signal SF32 from the control circuit 23. The control circuit 23 outputs a fourth pseudo signal SF32 when a later-described second overheat protection function diagnosis is executed. When the fourth pseudo signal SF32 is inputted to the second overheat detection circuit 62, the V-phase overheated state is generated in a pseudo manner even if the V-phase overheated state is not actually generated. The second overheat detection circuit 62, when receiving the fourth pseudo signal SF2, outputs the second overheat signal So32.

The third overheat detection circuit 63 detects the temperature of the W-phase switch pair (hereinafter, "W-phase temperature") in the motor drive circuit 22. Specifically, the W-phase temperature may be, for example, one of the temperatures of the two semiconductor switching elements included in the W-phase switch pair, as in the U-phase temperature. The third overheat detection circuit 63 outputs the third temperature signal STM3 which is an analog signal indicating the detected W-phase temperature.

The third overheat detection circuit 63 further has a function to detect the W-phase overheated state. Specifically, the third overheat detection circuit 63 outputs a third overheat signal So33 when the W-phase temperature is, for example, equal to or higher than the first W-phase temperature threshold. The third overheat signal So33 indicates generation of the W-phase overheated state. The first W-phase temperature threshold may be, for example, higher than the aforementioned normal temperature range.

The third overheat detection circuit 63 receives a fifth pseudo signal SF33 from the control circuit 23. The control circuit 23 outputs the fifth pseudo signal SF33 when executing a later-described third overheat protection function diagnosis. When the fifth pseudo signal SF33 is inputted to the third overheat detection circuit 63, the W-phase overheated state is generated in a pseudo manner even if the W-phase overheated state is not actually generated. The third overheat detection circuit 63 outputs the third overheat signal So33 when receiving the fifth pseudo signal SF3.

At least two of the first U-phase temperature threshold, the first V-phase temperature threshold and the first W-phase temperature threshold may be equal. The first U-phase temperature threshold, the first V-phase temperature threshold and the first W-phase temperature threshold may be different from each other.

The interruption latch circuit 70 receives the trigger determination information STR. The interruption latch circuit 70 can further receive the overvoltage signal So1, the overcurrent signal So2, the first overheat signal So31, the second overheat signal So32, and the third overheat signal So33. The interruption latch circuit 70 outputs the interruption information SS based on these information and signals. The interruption latch circuit 70 may further output failure detection information Sor.

The interruption latch circuit 70, when the electric working machine 1 is in a drive permitted state, outputs interruption information SS whose logic level is high indicating the command permission to turn on the interruption switch 29. The drive permitted state indicates a state where the motor 21 may be driven. The interruption latch circuit 70, when the electric working machine 1 is in a drive prohibited state, outputs the interruption information SS whose logic level is low indicating the command interruption to turn off the interruption switch 29. The drive prohibited state indicates a state where the motor 21 should not be driven.

In the present embodiment, the drive permitted state includes (i) a state where the trigger determination information STR indicates the trigger-on state, and (ii) a failure undetected state. The failure undetected state indicates a state where the overvoltage signal So1, the overcurrent signal So2, the first overheat signal So31, the second overheat signal So32, and the third overheat signal So33 are not inputted. In other words, the failure undetected state indicates a state where none of the aforementioned five failure states is detected.

In the present embodiment, the drive prohibited state includes a state where the trigger determination information STR indicates the trigger-off state and/or a failure detected state. The failure detected state indicates a state where the overvoltage signal So1, the overcurrent signal So2, the first overheat signal So31, the second overheat signal So32 and/or the third overheat signal So33 is inputted. In other words, the failure detected state is a state where one or more of the aforementioned five failure states is detected.

The interruption latch circuit 70 further has an interruption latch function. The interruption latch function is a function to maintain the interruption switch 29 to be off until at least the trigger operating device 20 is off-operated once, even after the electric working machine 1 is shifted to the failure undetected state from the failure detected state where the interruption switch 29 is turned off. The interruption latch circuit 70 continuously outputs the interruption information SS indicating the command interruption to maintain the interruption switch 29 to be off.

The interruption latch circuit 70 may be, for example, configured as shown in FIG. 3. As shown in FIG. 3, the interruption latch circuit 70 includes a first flip flop (FF) 71, an OR circuit 72, a NOT circuit 73, an OR circuit 74, a second flip flop (FF) 75, an AND circuit 76, resistors R7, R8, and capacitors C2, C3. In the present embodiment, the first FF 71 and the second FF 75 are, for example, D-type FF. The first FF 71 and the second FF 75 each includes a clock input terminal, a data input terminal, and an output terminal. Each time a rising edge (that is, change of logic level from low to high) of the signal inputted to the clock input terminal occurs, the first FF 71 and the second FF 75 each output a signal having the same logic level as the signal inputted to the data input terminal at that time from the output terminal. After the rising edge occurs and until the next rising edge occurs again, the first FF 71 and the second FF 75 maintain the logic level of the signal outputted from the output terminal even if the logic level of the signal inputted to the data input terminal changes.

The OR circuit 72 includes five input terminals. The five input terminals can receive the overvoltage signal So1, the overcurrent signal So2, the first overheat signal So31, the second overheat signal So32, and the third overheat signal So33. The OR circuit 72 calculates a logical sum of the signal inputted to the five input terminals and outputs the calculation result.

The trigger determination information STR is inputted to the clock input terminal of the first FF 71 and the AND circuit 76. The trigger determination information STR is further inputted to the OR circuit 74 via the capacitor C2.

The resistor R8 is connected between a connection point of the capacitor C2 and the OR circuit 74, and the ground line. A circuit including the capacitor C2 and the resistor R8 functions as a differentiation circuit that differentiates the trigger determination information STR and outputs the resulting value to the OR circuit 74.

An output signal of the OR circuit 72 is inputted to the NOT circuit 73, and also to the OR circuit 74 via the resistor R7. The output signal of the OR circuit 72 is further inputted to the control circuit 23 as the failure detection information Sor.

The capacitor C3 is connected between a connection point of the resistor R7 and the OR circuit 74, and the ground line. A circuit including the resistor R7 and the capacitor C3 functions as an integral circuit that integrates the output signal of the OR circuit 72 and outputs the resulting value to the OR circuit 74. The output signal of the OR circuit 74 is also inputted to the clock input terminal of the second FF 75.

An output signal of the NOT circuit 73 is inputted to the data input terminal of the first FF 71 and the data input terminal of the second FF 75. An output signal of the first FF 71 and an output signal of the second FF 75 are inputted to the AND circuit 76.

The interruption latch circuit 70 configured as above operates as follows, for example. Assume that the electric working machine 1 is in the failure undetected state, and the logic level of the trigger determination information STR is low which indicates the trigger-off state. In this state, the output signal of the AND circuit 76 is low level. In other words, in this state, the interruption information SS indicates the command interruption. Therefore, the interruption switch 29 is turned off.

Further, assume that the overvoltage signal So1, the overcurrent signal So2, the first overheat signal So31, the second overheat signal So32, and the third overheat signal So33 are not inputted to the OR circuit 72. In this state, the logic levels of the data input terminals of the first FF 71 and the second FF 75 are high.

From the state as above, assume a situation where the logic level of the trigger determination information STR changes to high which indicates the trigger-on state. When the logic level of the trigger determination information STR changes to high, a rising edge occurs in signals inputted to the clock input terminals of the first FF 71 and the second FF 75. Therefore, the logic levels of the signals outputted from the output terminal of the first FF 71 and the second FF 75 change to high. As a result, the output signal of the AND circuit 76 changes to high. In other words, in this case, the interruption information SS changes to information indicating the command permission. Therefore, the interruption switch 29 is turned on Assume a situation where the overvoltage signal So1, the overcurrent signal So2, the first overheat signal So31, the second overheat signal So32 and/or the third overheat signal So33 is inputted to the OR circuit 72, from the situation where the interruption information SS indicating the command permission is outputted from the interruption latch circuit 70 as above (that is, situation where the electric working machine 1 is shifted to the failure detected state). In this situation, the logic level of the data input terminal of the second FF 75 changes to low. After the logic level of the data input terminal of the second FF 75 changes to low, the logic level of the clock input terminal of the second FF 75 changes to high. As a result, the output signal of the second FF 75 changes to low level, and the output signal of the AND circuit 76 changes to low level. In other words, the interruption information SS changes to information indicating the command interruption. Therefore, the interruption switch 29 is turned off. Time difference from when the logic level of the data input terminal becomes low until when the logic level of the clock input terminal becomes high is based on a time constant of the aforementioned integral circuit.

Assume a situation where, from the situation where the interruption information SS indicating the command interruption is outputted as a result of the failure as above, the high-level signal inputted to the OR circuit 72 is changed to a low-level signal due to recovery from the failure. In this situation, the logic levels of the data input terminals of the first FF 71 and the second FF 75 change to high. However, while the logic level of the trigger determination information STR is maintained to be high, the output signals of the first FF 71 and the second FF 75 do not change, and the interruption information SS is maintained to indicate the command interruption. Therefore, the interruption switch 29 is kept to be off.

Further, assume a situation where, in the situation of recovery from the failure as above, the trigger operating device 20 is off-operated, and on-operated again. When the trigger operating device 20 is off-operated, the logic levels of the clock input terminals of the first FF 71 and the second FF 75 change to low. When the trigger operating device 20 is off-operated and then on-operated again, the logic levels of the clock input terminals of the first FF 71 and the second FF 75 change to high, and the output signals of the first FF 71 and the second FF 75 change to high level. This changes the output signal of the AND circuit 76 to high level, and the interruption information SS is changed to indicate the command permission. Therefore, the interruption switch 29 is turned on.

As above, the interruption latch circuit 70 executes various functions including the function to output the interruption information SS and the interruption latch function in hardware processing, without executing software processing.

The control circuit 23 operates by the power-supply voltage supplied from the aforementioned power-supply circuit. The control circuit 23 includes a microcomputer provided with a CPU 24 and a memory 25. The memory 25 may include a semiconductor memory such as a RAM, a ROM, and a flash memory. The memory 25 stores various programs and data that the CPU 24 reads and executes in order to achieve various functions of the electric working machine 1. These functions are not limited to software processing as mentioned above, and some or all of the functions may be achieved by hardware that includes a logic circuit, an analog circuit and the like.

The control circuit 23 receives the first trigger information ST1, the second trigger information ST2, the trigger determination information STR, the first discharge permission signal SA1, the second discharge permission signal SA2, the first off detection signal SB1, the second off detection signal SB2, the interruption information SS, the voltage signal SV, the current signal SC, the first temperature signal STM1 to the third temperature signal STM3, and the failure detection information Sor. The control circuit 23 further receives information indicating user's operation of the main power switch 30 from the main power switch 30.

The control circuit 23 enables or disables the main operation of the electric working machine 1 based on the information inputted from the main power switch 30. The control circuit 23 alternately enables or disables the main operation each time the main power switch 30 is pressed. The control circuit 23 executes various functions based on each of the aforementioned information and signals inputted to the control circuit 23.

The control circuit 23 of the present embodiment disables the main operation, after enabling the main operation, when the trigger operating device 20 is off-operated for a prescribed time even if the main power switch 30 is not operated.

The control circuit 23, when receiving the first discharge permission signal SA1 and the second discharge permission signal SA2, outputs the third discharge permission signal SA3 or the fourth discharge permission signal SA4. In this case, the switch 37 on the first power supply line 91 or the switch 47 on the second power supply line 92 is turned on.

The control circuit 23, when receiving the first discharge permission signal SA1 without receiving the second discharge permission signal SA2, outputs the third discharge permission signal SA3 without outputting the fourth discharge permission signal SA4. In this case, the switch 37 on the first power supply line 91 is turned on and the switch 47 on the second power supply line 92 is turned off.

The control circuit 23, when receiving the second discharge permission signal SA2 without receiving the first discharge permission signal SA1, outputs the fourth discharge permission signal SA4 without outputting the third discharge permission signal SA3. In this case, the switch 47 on the second power supply line 92 is turned on and the switch 37 on the first power supply line 91 is turned off.

The control circuit 23, when the trigger operating device 20 is on-operated for an enabling period during which the main operation is enabled, outputs the motor drive command SD to the motor drive circuit 22 to drive the motor 21.

The control circuit 23, when the first trigger information ST1 and the second trigger information ST2 indicate the trigger-on state (that is, logic levels are high), determines that the trigger operating device 20 is on-operated and outputs the motor drive command SD. The control circuit 23, when the first trigger information ST1 and/or the second trigger information ST2 indicates the trigger-off state (that is, logic level is low), determines that the trigger operating device 20 is off-operated and does not output the motor drive command SD.

The control circuit 23 outputs the trigger detection information ST0 to the first battery pack 5 and the second battery pack 7. The trigger detection information ST0 indicates whether the trigger operating device 20 is on-operated. The control circuit 23, when determining that the trigger operating device 20 is off-operated, outputs the trigger detection information ST0 whose logic level is low. The trigger detection information ST0 whose logic level is low indicates that the trigger operating device 20 is off-operated. The control circuit 23, when determining that the trigger operating device 20 is on-operated, outputs the trigger detection information ST0 whose logic level is high. The trigger detection information ST0 whose logic level is high indicates that trigger operating device 20 is on-operated. While the power-supply voltage is not supplied to the control circuit 23 and the control circuit 23 stops operation, the logic level of the trigger detection information ST0 is maintained to be low.

The control circuit 23, when outputting the motor drive command SD during the enabling period, stores a motor drive history indicating that the motor 21 is driven on the memory 25.

The control circuit 23 has a failure detection function. Specifically, the failure detection function includes an overvoltage detection function, an overcurrent detection function, and an overheat detection function. The failure detection function is executed when the CPU 24 executes a later-described main process in the control circuit 23. In other words, these failure detection functions are executed based on software.

The overvoltage detection function is a function to detect the aforementioned overvoltage state. The control circuit 23 detects the overvoltage state based on the input battery voltage value indicated by the voltage signal SV received from the overvoltage detection circuit 50. For example, the control circuit 23 may determine that the overvoltage state has been generated when the input battery voltage value is equal to or higher than the second voltage threshold. The second voltage threshold may be, for example, higher than the aforementioned normal voltage range. The second voltage threshold may be, for example, the same value as the first voltage threshold, may be higher than the first voltage threshold, or may be lower than the first voltage threshold.

The overcurrent detection function is a function to detect the aforementioned overcurrent state. The control circuit 23 detects the overcurrent state based on the motor current value indicating the current signal SC received from the current detection circuit 55. The control circuit 23 may determine that the overcurrent state has been generated when the motor current value is equal to or higher than the second current threshold. The second current threshold may be, for example, higher than the aforementioned normal current range. The second current threshold may be, for example, the same value as the first current threshold, may be higher than the first current threshold, or may be lower than the first current threshold.

More specifically, the overheat detection function includes a first overheat detection function, a second overheat detection function and a third overheat detection function.

The first overheat detection function is a function to detect the aforementioned U-phase overheated state. The control circuit 23 detects the U-phase overheated state based on the U-phase temperature indicated by the first temperature signal STM1 received from the first overheat detection circuit 61. The control circuit 23 may determine that the U-phase overheated state has been generated when the U-phase temperature is equal to or higher than the second U-phase temperature threshold. The second U-phase temperature threshold may be higher than the aforementioned normal temperature range. The second U-phase temperature threshold may be, for example, the same value as the first U-phase temperature threshold, may be higher than the first U-phase temperature threshold, or may be lower than the first U-phase temperature threshold.

The second overheat detection function is a function to detect the aforementioned V-phase overheated state. The control circuit 23 detects the V-phase overheated state based on the V-phase temperature indicated by the second temperature signal STM2 received from the second overheat detection circuit 62. For example, the control circuit 23 may determine that the V-phase overheated state has been generated when the V-phase temperature is equal to or higher than the second V-phase temperature threshold. The second V-phase temperature threshold may be higher than the aforementioned normal temperature range. The second V-phase temperature threshold may be, for example, the same value as the first V-phase temperature threshold, may be higher than the first V-phase temperature threshold, or may be lower than first V-phase temperature threshold.

The third overheat detection function is a function to detect the aforementioned W-phase overheated state. The control circuit 23 detects the W-phase overheated state based on the W-phase temperature indicated by the third temperature signal STM3 received from the third overheat detection circuit 63. For example, the control circuit 23 may determine that the W-phase overheated state has been generated when the W-phase temperature is equal to or higher than the second W-phase temperature threshold. The second W-phase temperature threshold may be higher than the aforementioned normal temperature range. The second W-phase temperature threshold may be, for example, the same value as the first W-phase temperature threshold, may be higher than the first W-phase temperature threshold, or may be lower than the first W-phase temperature threshold.

The second U-phase temperature threshold, the second V-phase temperature threshold and the second W-phase temperature threshold may be the same value, any two of them may be the same value, or all of them may be different values.

The control circuit 23, while outputting the motor drive command SD, executes a forced stop function. The forced stop function includes stopping output of the motor drive command SD to stop the motor 21 even if the trigger operating device 20 is on-operated in response to detection of any of the failures by the aforementioned failure detection functions. The forced stop function includes storing a failure drive history on the memory 25. The failure drive history indicates that a failure has been detected during driving of motor.

3. Description of Self-Diagnosis Function

The control circuit 23 has a self-diagnosis function. The self-diagnosis function is a function to execute self-diagnoses corresponding to diagnosis items one by one in a prescribed order at a corresponding diagnosis timing.

In the present embodiment, the diagnosis items include, for example, a first diagnosis item, a second diagnosis item, a third diagnosis item, a fourth diagnosis item, a fifth diagnosis item, and a sixth diagnosis item. The first diagnosis item is a trigger detection function diagnosis. The second diagnosis item is a power supply line function diagnosis. The third diagnosis item is a first overheat protection function diagnosis. The fourth diagnosis item is a second overheat protection function diagnosis. The fifth diagnosis item is a third overheat protection function diagnosis. The sixth diagnosis item is an overvoltage protection function diagnosis.

The prescribed order to execute the self-diagnosis of each diagnosis item may be any order. The prescribed order of the present embodiment is that, for example, the first is the first diagnosis item, the second is the second diagnosis item, the third is the third diagnosis item, the fourth is the fourth diagnosis item, the fifth is the fifth diagnosis item, and the sixth is the sixth diagnosis item. Next to the sixth diagnosis item is the first diagnosis item, and the diagnosis is executed again from the first diagnosis item in the aforementioned order.

The diagnosis timing of each diagnosis item, for example, except for the diagnosis timing of the power supply line function diagnosis, corresponds to a disabling timing. The disabling timing is when the main operation is disabled. The disabling timing may correspond to any timing from immediately after the main operation is disabled until a given length of time elapses.

One of the reasons why the diagnosis timing of each diagnosis item other than the power supply line function diagnosis is set to the disabling timing is as follows. That is, the control circuit 23 of the present embodiment is configured to interrupt the self-diagnosis when the trigger operating device 20 is on-operated during the self-diagnosis. When the self-diagnosis is executed at a timing when probability that the trigger operating device 20 is on-operated is low, probability that the self-diagnosis is interrupted is also low. The disabling timing can be considered to correspond to a timing when the user of the electric working machine 1 indicates that the operation using the electric working machine 1 has been done. For a while from this timing, it is expected that the probability that the trigger operating device 20 is on-operated is low. Thus, in the present embodiment, except for the diagnosis timing of the power supply line function diagnosis, the diagnosis timing of each diagnosis item is set to the disabling timing.

The control circuit 23 does not execute the self-diagnosis when the motor drive history is not stored during the last enabling period or the failure drive history is stored during the last enabling period at the disabling timing. In this case, the diagnosis item at the next diagnosis timing is again set to be the diagnosis item that has not been executed this time. The last enabling period means the enabling period immediately before the disabling timing. When the motor drive history is not stored during the last enabling period, it means that the motor 21 is not driven during the last enabling period. When the failure drive history is stored during the last enabling period, it means that a failure has been detected when the motor 21 is driven and the motor 21 has stopped during the last enabling period.

Execution timing of the power supply line function diagnosis, for example, may correspond to an enabling timing. The enabling timing is when the main operation is enabled. The enabling timing may correspond to any timing from immediately after the main operation is enabled until a given length of time elapses.

The control circuit 23 stores a self-diagnosis history indicating a result of the self-diagnosis for each diagnosis item on the memory 25. Specifically, the control circuit 23, when the result of the diagnosis shows a failure, stores information indicating "failure" determination as the self-diagnosis history. In this case, the control circuit 23 again executes the self-diagnosis of the same diagnosis item as that of this time at the next enabling timing. The control circuit 23, when the result of the diagnosis shows no failure, stores information indicating "no failure" determination as the self-diagnosis history.

The control circuit 23, when the diagnosis is interrupted without completed properly, again executes the self-diagnosis of the same diagnosis item as that of this time at a regular diagnosis timing corresponding to the diagnosis item, which comes first after the interruption.

In the trigger detection function diagnosis, the control circuit 23 diagnoses whether the trigger detection circuit 80 and the interruption latch circuit 70 properly operate. Specifically, the control circuit 23 outputs the first pseudo signal SF1 to the trigger detection circuit 80 to set the first trigger information ST1 to information indicating the trigger-on state in a pseudo manner (that is, high level).

The control circuit 23, while outputting the first pseudo signal SF1, executes the diagnosis based on the first trigger information ST1, the second trigger information ST2 and the interruption information SS received by the control circuit 23. At the timing when the trigger detection function diagnosis is executed, the trigger operating device 20 is off-operated. Therefore, when trigger detection circuit 80 and the interruption latch circuit 70 properly operate and the first pseudo signal SF1 is outputted, the logic level of the first trigger information ST1 becomes high, the logic level of the second trigger information ST2 becomes low, and the logic level of the interruption information SS becomes low.

The control circuit 23, when each of the aforementioned information is appropriate (that is, the logic level of the first trigger information ST1 is high, and the logic levels of the second trigger information ST2 and the interruption information SS are low), determines that the trigger detection circuit 80 and the interruption latch circuit 70 properly operate. In this case, the control circuit 23 determines that the self-diagnosis result has no failure, and stores the self-diagnosis history indicating the "no failure" determination on the memory 25.

The control circuit 23, when the first trigger information ST1 is not appropriate, determines that the trigger detection circuit 80 does not properly operate. In this case, the control circuit 23 determines that the self-diagnosis result has a failure, and stores the self-diagnosis history indicating the "failure" determination on the memory 25.

The control circuit 23, when the interruption information SS is not appropriate, determines that the trigger detection circuit 80 or the interruption latch circuit 70 does not properly operate. In this case, the control circuit 23 determines that the self-diagnosis result has a failure, and stores the self-diagnosis history indicating the "failure" determination on the memory 25.

When the second trigger information ST2 is not appropriate, the control circuit 23 may determine that the trigger detection circuit 80 does not properly operate. However, in the present embodiment, the diagnosis is interrupted.

In the power supply line function diagnosis, the control circuit 23 diagnoses whether the first switching circuit 36 and the second switching circuit 46 properly operate.

Specifically, the control circuit 23, when not receiving the first discharge permission signal SA1 from the first battery pack 5, outputs the third discharge permission signal SA3. The control circuit 23, when receiving the first off detection signal SB1 from the first off detection circuit 39 while outputting the third discharge permission signal SA3 (that is, when the switches 32, 37 are OFF), determines that the first switching circuit 36 properly operates. The control circuit 23, when not receiving the first off detection signal SB1 from the first off detection circuit 39 while outputting the third discharge permission signal SA3, determines that the first switching circuit 36 does not properly operate.

Further, the control circuit 23, when not receiving the second discharge permission signal SA2 from the second battery pack 7, outputs the fourth discharge permission signal SA4. The control circuit 23, when receiving the second off detection signal SB2 from the second off detection circuit 49 while outputting the fourth discharge permission signal SA4 (that is, when the switches 42, 47 are OFF), determines that the second switching circuit 46 properly operates. The control circuit 23, when not receiving the second off detection signal SB2 from the second off detection circuit 49 while outputting the fourth discharge permission signal SA4, determines that the second switching circuit 46 does not properly operate.

The control circuit 23, when not determining in the power supply line function diagnosis that the first switching circuit 36 and the second switching circuit 46 do not operate properly, determines that the self-diagnosis result has no failure. In this case, the control circuit 23 stores the self-diagnosis history indicating the "no failure" determination on the memory 25. The control circuit 23, when determining that either the first switching circuit 36 or the second switching circuit 46 does not operate properly, determines that the self-diagnosis result has a failure. In this case, the control circuit 23 stores the self-diagnosis history indicating the "failure" determination on the memory 25.

One of the reasons why the diagnosis timing of the power supply line function diagnosis is set to the enabling timing is as follows. For example, the battery failure detection circuit 12, when not detecting a failure of the first battery pack 5, outputs the first discharge permission signal SA1 based on the trigger detection information ST0. More specifically, the battery failure detection circuit 12, in response to recognition that the trigger operating device 20 is on-operated based on the trigger detection information ST0, outputs the first discharge permission signal SA1 for a certain period from the time of recognition. Depending on a use state of the electric working machine 1 by the user, there is a possibility that the main operation is disabled before the certain period elapses from when the trigger operating device 20 is on-operated. In other words, there is a possibility that the main operation is disabled in a state where the first discharge permission signal SA1 is outputted. In this case, since the first discharge permission signal SA1 is outputted, the power supply line function diagnosis cannot be appropriately executed. On the other hand, the enabling timing is a state where the user is going to use the electric working machine 1 from now on, and probability that the first discharge permission signal SA1 is outputted is low. Thus, in the present embodiment, the diagnosis timing of the power supply line function diagnosis is set to the enabling timing.

In the first overheat protection function diagnosis, the control circuit 23 diagnose whether the first overheat detection circuit 61 and the interruption latch circuit 70 properly operate. Specifically, the control circuit 23 outputs the third pseudo signal SF31 to the first overheat detection circuit 61 to generate the U-phase overheated state in a pseudo manner. The control circuit 23, while outputting the third pseudo signal SF31, executes the diagnosis based on the first temperature signal STM1 and the failure detection information Sor received by the control circuit 23.

The control circuit 23, when the U-phase temperature indicated by the first temperature signal STM1 is equal to or higher than the specific U-phase threshold and the logic level of the failure detection information Sor is high, determines that the first overheat detection circuit 61 and the interruption latch circuit 70 properly operate. In this case, the control circuit 23 determines that the self-diagnosis result has no failure, and stores the self-diagnosis history indicating the "no failure" determination on the memory 25. The U-phase threshold may be any value. The U-phase threshold may be, for example, a specific value higher than the aforementioned normal temperature range. The U-phase threshold may be, for example, the same value as the aforementioned first U-phase temperature threshold or the second U-phase temperature threshold.

The control circuit 23, when the U-phase temperature indicated by the first temperature signal STM1 is lower than the U-phase threshold, determines that the first overheat detection circuit 61 does not properly operate. In this case, the control circuit 23 determines that the self-diagnosis result has a failure, and stores the self-diagnosis history indicating the "failure" determination on the memory 25.

The control circuit 23, when the U-phase temperature indicated by the first temperature signal STM1 is equal to or higher than the U-phase threshold (that is, the first overheat detection circuit 61 operates properly), while the logic level of the failure detection information Sor is low, determines that the interruption latch circuit 70 does not properly operate. In this case, the control circuit 23 determines that the self-diagnosis result has a failure and stores the self-diagnosis history indicating the "failure" determination on the memory 25.

In the second overheat protection function diagnosis, the control circuit 23 outputs the fourth pseudo signal SF32 to the second overheat detection circuit 62. Then, the control circuit 23 based on the second temperature signal STM2 and the failure detection information Sor, diagnoses whether the second overheat detection circuit 62 and the interruption latch circuit 70 properly operate, in the same manner as in the first overheat protection function diagnosis.

In the third overheat protection function diagnosis, the control circuit 23 outputs the fifth pseudo signal SF33 to the third overheat detection circuit 63. Then, the control circuit 23, based on the third temperature signal STM3 and the failure detection information Sor, diagnoses whether the third overheat detection circuit 63 and the interruption latch circuit 70 properly operate, in the same manner as in the first overheat protection function diagnosis.

In the overvoltage protection function diagnosis, the control circuit 23 diagnoses whether the overvoltage detection circuit 50 and the interruption latch circuit 70 properly operate. Specifically, the control circuit 23 outputs the second pseudo signal SF2 to the overvoltage detection circuit 50 to generate the overvoltage state in a pseudo manner. The control circuit 23, while outputting the second pseudo signal SF2, executes the diagnosis based on the voltage signal SV and the failure detection information Sor received by the control circuit 23.

The control circuit 23, when the input battery voltage value indicated by the voltage signal SV is equal to or higher than the specific voltage determination threshold and the logic level of the failure detection information Sor is high, determines that the overvoltage detection circuit 50 and the interruption latch circuit 70 properly operate. In this case, the control circuit 23 determines that the self-diagnosis result has no failure, and stores the self-diagnosis history indicating the "no failure" determination on the memory 25. The voltage determination threshold may be any value. The voltage determination threshold may be, for example, a specific value higher than the aforementioned normal voltage range. The voltage determination threshold may be, for example, the same value as the aforementioned first voltage threshold or second voltage threshold.

The control circuit 23 when the input battery voltage value indicated by the voltage signal SV is lower than the voltage determination threshold, determines that the overvoltage detection circuit 50 does not properly operate. In this case, the control circuit 23 determines that the self-diagnosis result has a failure, and stores the self-diagnosis history indicating the "failure" determination on the memory 25.

The control circuit 23, when the input battery voltage value indicated by the voltage signal SV is equal to or higher than the voltage determination threshold (that is, the overvoltage detection circuit 50 operates properly) while the logic level of the failure detection information Sor is low, determines that the overvoltage detection circuit 50 does not properly operate. In this case, the control circuit 23 determines that the self-diagnosis result has a failure, and stores the self-diagnosis history indicating the "failure" determination on the memory 25.

4. Execution Example of Self-Diagnosis

Now, execution examples of the self-diagnosis function by the control circuit 23 will be described with reference to FIGS. 5 to 7.

Firstly, a first execution example shown in FIG. 5 will be described. The first execution example indicates a case where a result of each self-diagnosis has no failure. In the first execution example, the first diagnosis item is set as the diagnosis item to be executed first on and after time t1.

In the first execution example, the main operation is enabled at the time t1. Since the diagnosis timing of the first diagnosis item corresponds to the disabling timing, self-diagnosis of the first diagnosis item is not yet executed at the time t1.

In the first execution example, after the main operation is enabled at the time t1, the main operation is disabled at time t2 without the motor 21 being driven. The time t2 corresponds to the diagnosis timing of the first diagnosis item. However, since the motor 21 is not driven during the last enabling period corresponding to the time t2, the self-diagnosis of the first diagnosis item is not executed at the time t2.

In the first execution example, after the main operation is enabled at time t3, the main operation is disabled at time t4. The trigger operating device 20 is on-operated for a certain period from the time t3 to the time t4. In the first execution example, while the trigger operating device 20 is on-operated, the motor 21 is properly driven without being improperly stopped. At the time t4, based on the time t4 corresponding to the diagnosis timing of the first diagnosis item, the self-diagnosis of the first diagnosis item is executed. The first execution example shows an example when a result "no failure" is obtained in the self-diagnosis of the first diagnosis item started at the time t4.

In the first execution example, the main operation is enabled at time t5. At the time t5, based on the diagnosis item of the self-diagnosis to be executed next (hereinafter, "next diagnosis item") being the second diagnosis item, and the diagnosis timing of the second diagnosis item corresponding to the enabling timing, self-diagnosis of the second diagnosis item is executed. That the next diagnosis item is the second diagnosis item is based on the diagnosis result of the first diagnosis item executed at the time t4 having no failure. The first execution example shows an example when a result "no failure" is obtained in the self-diagnosis of the second diagnosis item started at the time t5.

In the first execution example, the main operation is disabled at time t6, and is enabled at time t7. At the time t7, the next diagnosis item is the third diagnosis item. That the next diagnosis item is the third diagnosis item is based on the diagnosis result of the second diagnosis item executed at the time t5 having no failure. The diagnosis timing of the third diagnosis item corresponds to the disabling timing. Therefore, the self-diagnosis of the third diagnosis item is not yet executed at the time t7.

In the first execution example, the main operation is disabled at time t8. For a certain period from the time t7 to the time t8, the trigger operating device 20 is on-operated. While the trigger operating device 20 is on-operated, the motor 21 is driven. However, in the first execution example, since a failure is detected by the failure detection function while the motor 21 is driven, on-operation of the trigger operating device 20 is disabled and the motor 21 is stopped.

The time t8 primarily corresponds to the diagnosis timing of the third diagnosis item to be executed next. However, in the last enabling period corresponding to the time t8, the motor 21 is stopped due to detection of a failure as mentioned above. Therefore, self-diagnosis of the third diagnosis item is not performed at the time t8.

In the first execution example, the main operation is enabled at time t9. Since the diagnosis timing of the third diagnosis item corresponds to the disabling timing, self-diagnosis of the third diagnosis item is not yet executed at the time t9.

In the first execution example, the main operation is disabled at time t10. For a certain period from the time t9 to the time t10, the trigger operating device 20 is on-operated. In the first execution example, while the trigger operating device 20 is on-operated, the motor 21 is properly driven without being stopped improperly. At the time t10, based on the time t10 corresponding to the diagnosis timing of the third diagnosis item, self-diagnosis of the third diagnosis item is executed. The first execution example shows an example when a result "no failure" is obtained in the self-diagnosis of the third diagnosis item started at the time t10.

In the first execution example, the main operation is enabled at time t11. In the time t11, the next diagnosis item is the fourth diagnosis item. That the next diagnosis item is the fourth diagnosis item is based on the diagnosis result of the third diagnosis item executed at the time t10 having no failure. The diagnosis timing of the fourth diagnosis item corresponds to the disabling timing. Therefore, self-diagnosis of the fourth diagnosis item is not yet executed at the time t11.

In the first execution example, the main operation is disabled at time t12. For a certain period from the time t11 to the time t12, the trigger operating device 20 is on-operated. In the first execution example, while the trigger operating device 20 is on-operated, the motor 21 is driven properly without being stopped improperly. At the time t12, based on the time t12 corresponding to the diagnosis timing of the fourth diagnosis item, self-diagnosis of the fourth diagnosis item is executed. The first execution example shows an example when a result "no failure" is obtained in the self-diagnosis of the fourth diagnosis item started at the time t12.

In the first execution example, the main operation is enabled at time t13. In the time t13, the next diagnosis item is the fifth diagnosis item. That the next diagnosis item is the fifth diagnosis item is based on the diagnosis result of the fourth diagnosis item executed at the time t12 having no failure. The diagnosis timing of the fifth diagnosis item corresponds to the disabling timing. Thus, self-diagnosis of fifth diagnosis item is not yet executed at the time t13.

Now, a second execution example shown in FIG. 6 will be described. The second execution example includes a case where a result of self-diagnosis "failure" is obtained. In the second execution example, the diagnosis item to be executed first at and after time t21 is set as the first diagnosis item.

Figure 6:
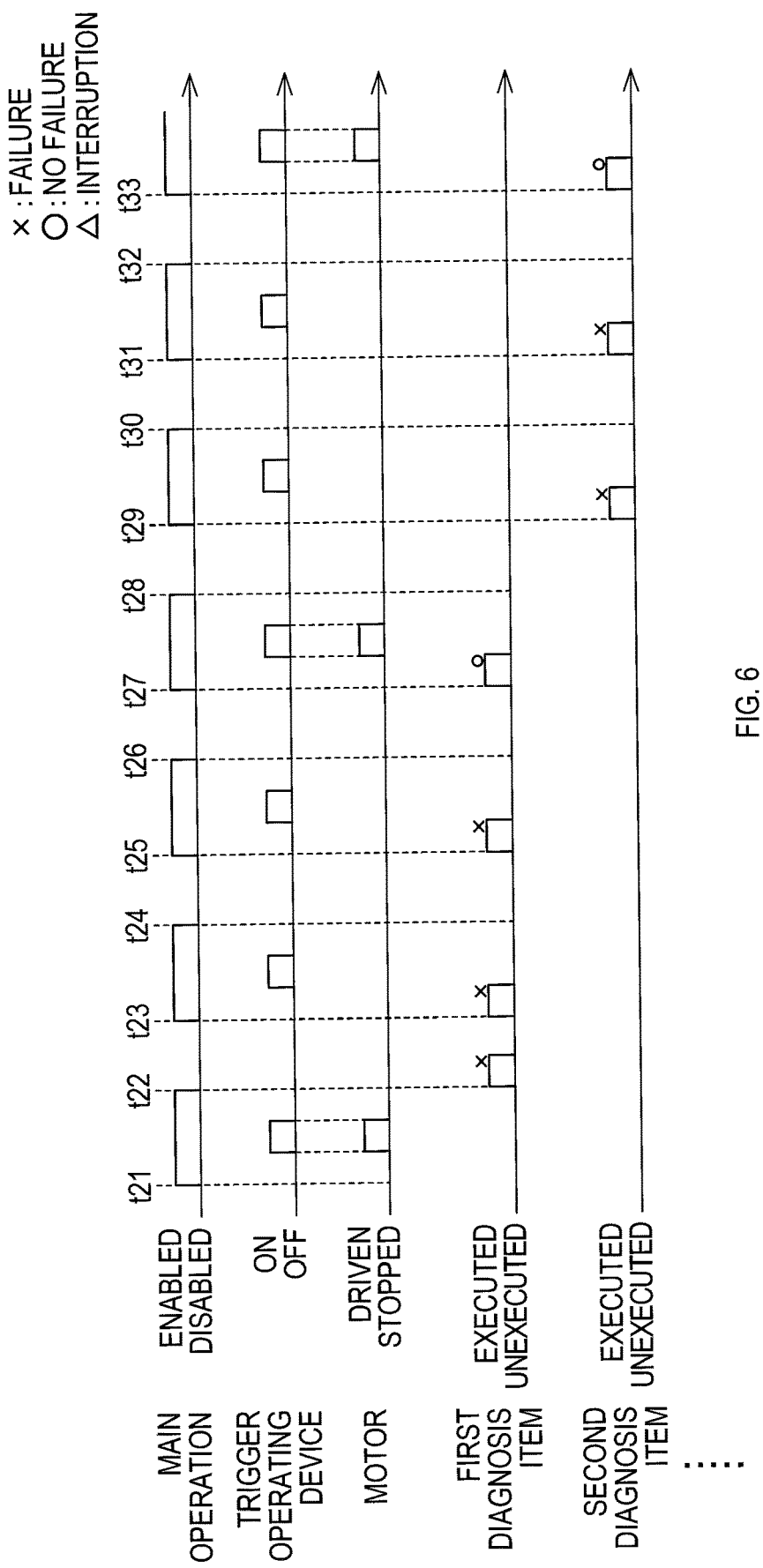
FIG. 6 is a time chart showing a second execution example of self-diagnosis.

As shown in FIG. 6, in the second execution example, the main operation is enabled at the time t21, and is disabled at time t22. For a certain period from the time t21 to the time t22, the trigger operating device 20 is on-operated. While the trigger operating device 20 is on-operated, the motor 21 is driven properly without being stopped improperly.

At the time t22, based on the time t22 corresponding to the diagnosis timing of the first diagnosis item, self-diagnosis of the first diagnosis item is executed. The second execution example shows an example when a result "failure" is obtained in the self-diagnosis of the first diagnosis item started at the time t22.

In the second execution example, the main operation is enabled at time t23. At the time t23, the next diagnosis item continues to be the first diagnosis item. That the next diagnosis item continues to be the first diagnosis item is based on the diagnosis result of the first diagnosis item having a failure in the last self-diagnosis executed at the time t22.

The diagnosis timing of the first diagnosis item primarily corresponds to the disabling timing. However, in the present embodiment, when self-diagnosis of the same diagnosis item is performed again based on the result of the last self-diagnosis having a failure, the diagnosis timing becomes the enabling timing. Accordingly, self-diagnosis of the first diagnosis item is again executed at the enabling timing of the time t23. The second execution example shows an example when a result "failure" is obtained also in the self-diagnosis of the first diagnosis item started at the time t23. In this case, as illustrated in the time t23 to t24 in FIG. 6, when the trigger operating device 20 is on-operated, the motor 21 is not driven.

In the second execution example, the main operation is disabled at time t24, and is enabled at time t25. In this case as well, similar to the case at the time t23, based on the last self-diagnosis result of the first diagnosis item having a failure, self-diagnosis of the first diagnosis item is executed again at the enabling timing of the time t25. The second execution example shows an example when a result "failure" is obtained also in the self-diagnosis of the first diagnosis item started at the time t25. In this case, as illustrated in the time t25 to t26 in FIG. 6, when the trigger operating device 20 is on-operated, the motor 21 is not driven.

In the second execution example, the main operation is disabled time at the time t26, and is enabled at time t27. In this case as well, similar to the case at the time t23 and time t25, based on the last self-diagnosis result of the first diagnosis item having a failure, self-diagnosis of the first diagnosis item is executed again at the enabling timing of the time t27. The second execution example shows an example when a result "no failure" is obtained in the self-diagnosis started at the time t27. In this case, as illustrated in the time t27 to t28 in FIG. 6, when the trigger operating device 20 is on-operated, the motor 21 is driven.

In the second execution example, the main operation is disabled at the time t28, and is enabled at time t29. At the time t29, based on the next diagnosis item being the second diagnosis item and the diagnosis timing of the second diagnosis item corresponds to the enabling timing, self-diagnosis of the second diagnosis item is executed. That the next diagnosis item is second diagnosis item is based on the diagnosis result of the first diagnosis item having no failure in the last self-diagnosis executed at the time t27. The second execution example shows an example when a result "failure" is obtained in the self-diagnosis started at the time t29.

In the second execution example, the main operation is disabled at time t30, and is enabled at time t31. At the time t31, based on the diagnosis result of the second diagnosis item having a failure in the last self-diagnosis, self-diagnosis of the second diagnosis item is executed again. The second execution example shows an example when a result "failure" is obtained also in the self-diagnosis started at the time t31.

In the second execution example, the main operation is disabled at time t32, and is enabled at time t33. In this case as well, similar to the case at the time t31, based on the last self-diagnosis result of the second diagnosis item having a failure, self-diagnosis of the second diagnosis item is executed again at the enabling timing of the time t33. The second execution example shows an example when a result "no failure" is obtained in the self-diagnosis started at the time t33.

Now, a third execution example shown in FIG. 7 will be described. The third execution example includes a case where self-diagnosis is interrupted. In the third execution example, the first diagnosis item is set as the diagnosis item to be executed first at or after time t41.

Figure 5:
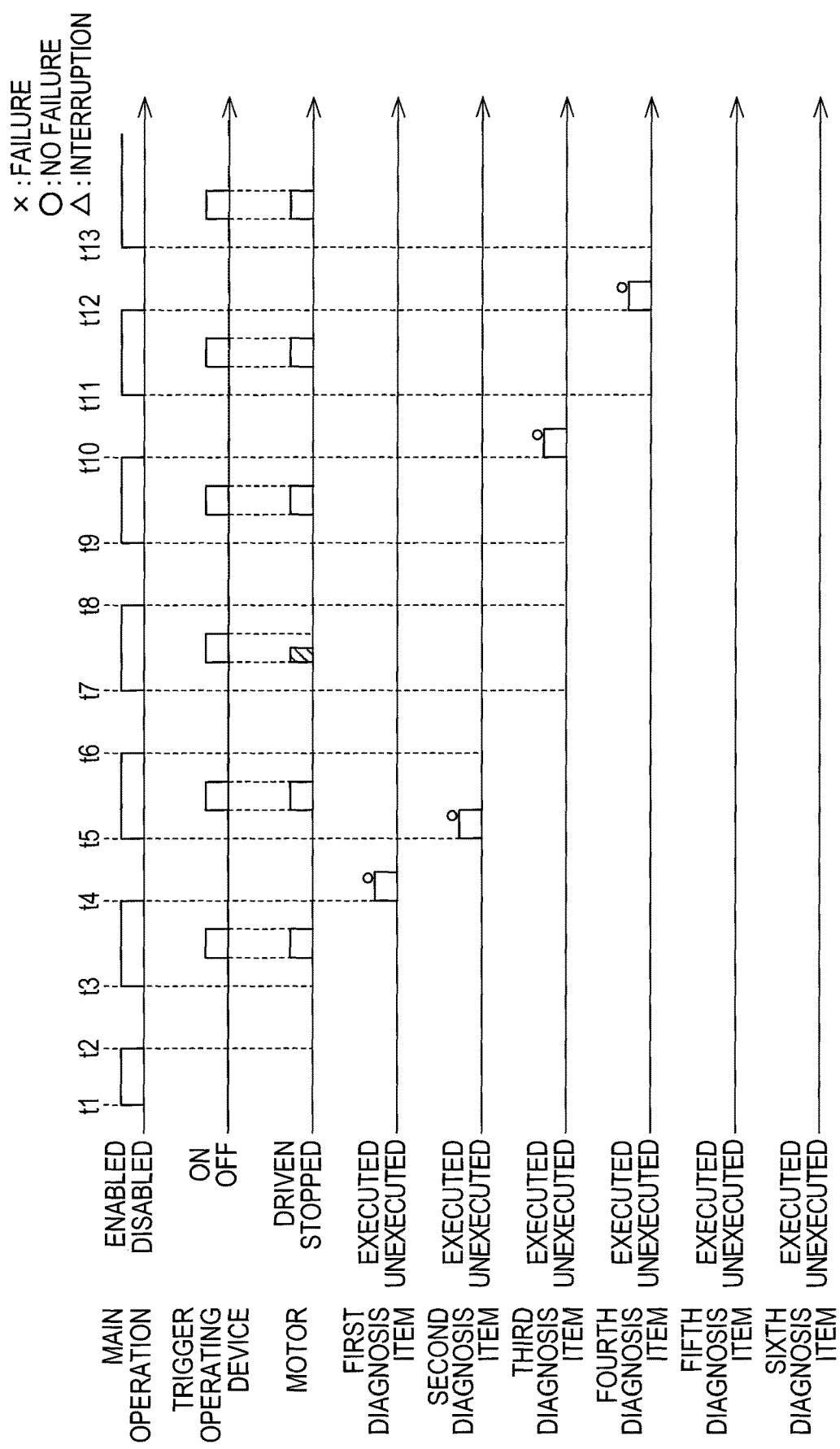
FIG. 5 is a time chart showing a first execution example of self-diagnosis.
Figure 7:
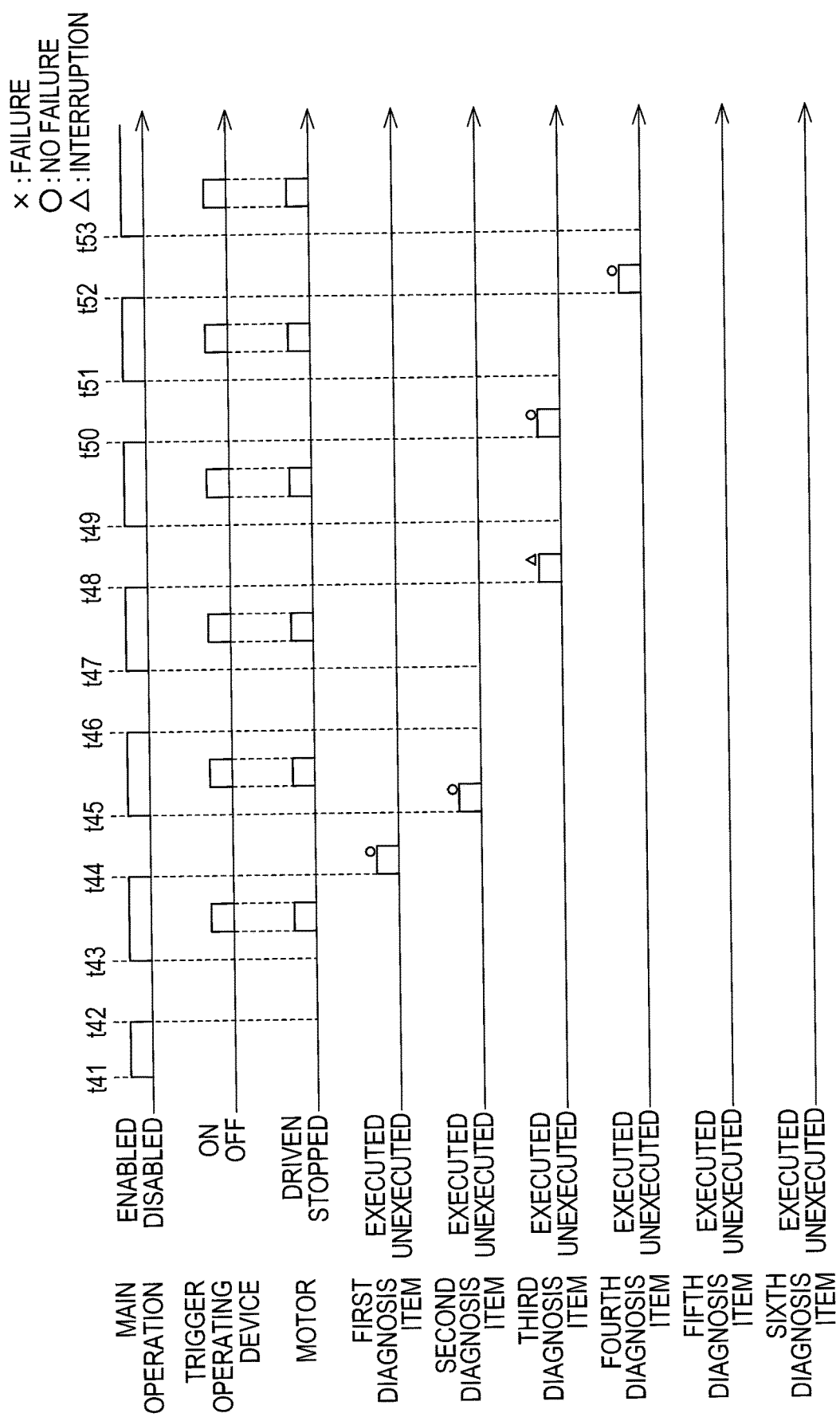
FIG. 7 is a time chart showing a third execution example of self-diagnosis.
Figure 8:
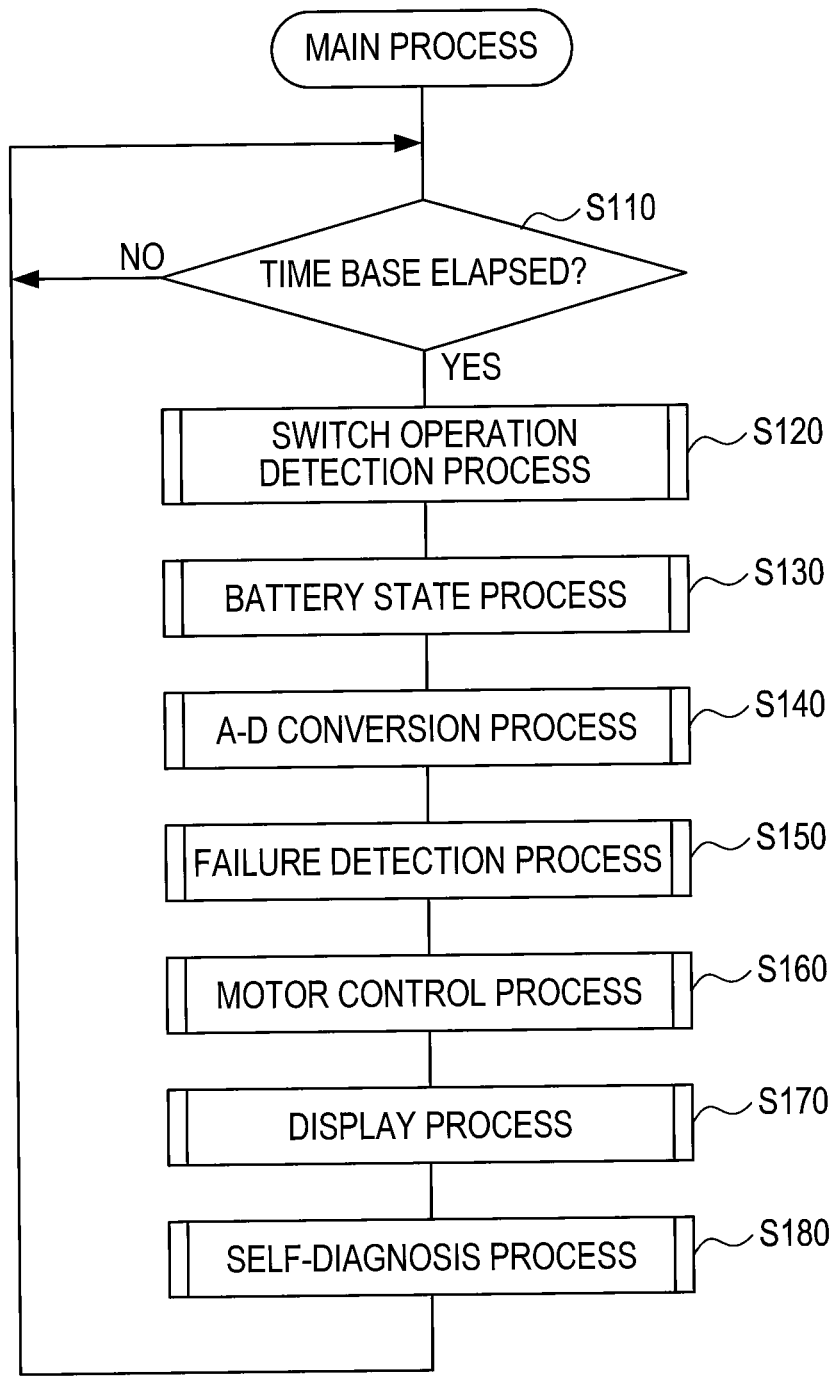
FIG. 8 is a flowchart showing a main process.

As shown in FIG. 7, in the third execution example, operation from the time t41 to t47 is the same as the operation from the time t1 to t7 of the first execution example shown in FIG. 5. Therefore, description of the operation from the time t41 to t47 will not be repeated.

In the third execution example, the main operation is enabled at the time t47, and is disabled at time t48. For a certain period from the time t47 to the time t48, the trigger operating device 20 is on-operated. In the third execution example, while the trigger operating device 20 is on-operated, the motor 21 is driven properly without being stopped improperly At the time t48, based on the time t48 corresponding to the diagnosis timing of the third diagnosis item, self-diagnosis of the third diagnosis item is executed. The third execution example shows an example when the self-diagnosis started at the time t48 is interrupted before completed properly. The control circuit 23, when an interruption condition is established during the self-diagnosis, interrupts the self-diagnosis. The interruption condition may include any condition. The interruption condition may be established, for example, when the trigger operating device 20 is on-operated.

In the third execution example, the main operation is enabled at time t49. In the present embodiment, when self-diagnosis is interrupted, the interrupted diagnosis item continues to be the next diagnosis item.

However, the next diagnosis timing after interruption is different from the next diagnosis timing when the self-diagnosis result has a failure. Specifically, the diagnosis timing after interruption corresponds to the prescribed diagnosis timing corresponding to the diagnosis item.

Therefore, self-diagnosis of the third diagnosis item is not executed at the time t49, and self-diagnosis of the third diagnosis item is executed at the disabling timing of the time t50. The third execution example shows an example when a result "no failure" is obtained in the self-diagnosis started at the time t50. As illustrated in the time t49 to t50 of FIG. 7, when the self-diagnosis is interrupted at the time of the last self-diagnosis, driving of the motor 21 is not limited in the next enabling period, and when the trigger operating device 20 is on-operated, the motor 21 is driven. The operation at or after the time t51 is the same as the operation at or after the time t11 in the first execution example shown in FIG. 5. Thus, description of the operation at or after the time t51 will not be repeated.

5. Main Process

Now, the main process executed by the control circuit 23 will be described with referent to FIGS. 8 to 14. The CPU 24 of the control circuit 23 executes the main process based on a main process program stored in memory 25 during a specified execution period. The specified execution period may be, for example, a period from when the main power switch 30 is turned on until the main power switch 30 is turned off and a later-described self-diagnosis process of S180 immediately after the turning-off of the main switch 30 is completed. Each execution example shown in FIGS. 5 to 7 is executed by the CPU 24 executing the main process.

The CPU 24, when starting the main process, determines in S110 whether a time base has elapsed since the last transition from S110 to S120. The time base means a control cycle. The control cycle may be any time. When the time base elapses in S110, the present process moves to S120.

In S120, the CPU 24 executes a switch operation detection process. Specifically, the CPU 24 detects an operation state of the trigger operating device 20 by the user of the electric working machine 1 based on the first trigger information ST1 and the second trigger information ST2. The CPU 24 outputs the trigger detection information ST0 corresponding to the detected operation state from the control circuit 23 to the first battery pack 5 and the second battery pack 7.

Figure 9:
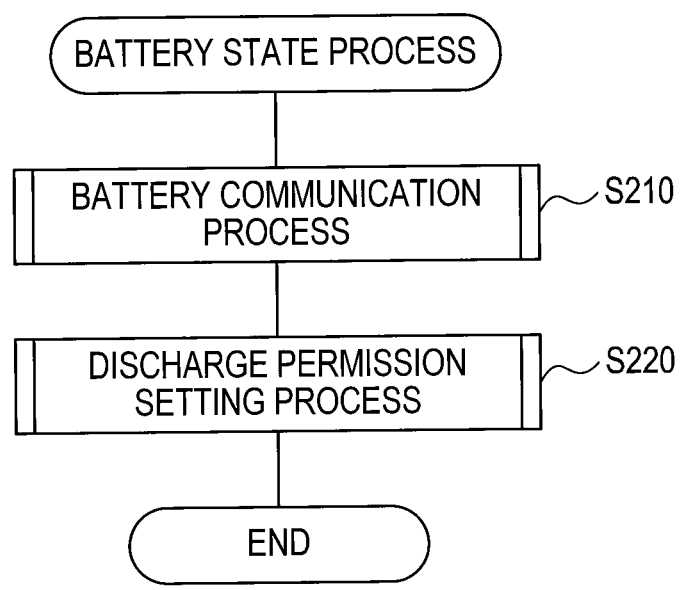
FIG. 9 is a flowchart showing detail of a battery state process of S130.

In S130, the CPU 24 executes a battery state process. Detail of the battery state process is as shown in FIG. 9. That is, the CPU 24, when moving to the battery state process, executes a battery communication process in S210. Specifically, the CPU 24 performs specific data communication with the first battery pack 5 and the second battery pack 7. The battery communication process includes a process to acquire the first discharge permission signal SA1 and a process to acquire the second discharge permission signal SA2.

In S220, the CPU 24 executes a discharge permission setting process. Specifically, the CPU 24, when the first discharge permission signal SA1 and the second discharge permission signal SA2 are acquired in the battery communication process of S210, outputs the third discharge permission signal SA3 or the fourth discharge permission signal SA4 from the control circuit 23. When the first discharge permission signal SA1 is acquired and the second discharge permission signal SA2 is not acquired in the battery communication process of S210, the CPU 24 outputs the third discharge permission signal SA3 from the control circuit 23. When the second discharge permission signal SA2 is acquired and the first discharge permission signal SA1 is not acquired in the battery communication process of S210, the CPU 24 outputs the fourth discharge permission signal SA4 from the control circuit 23. When the third discharge permission signal SA3 is outputted from the control circuit 23, the switch 37 is turned on and battery power can be supplied from the first battery pack 5 to the motor drive circuit 22. When the fourth discharge permission signal SA4 is outputted from the control circuit 23, the switch 47 of the second switching circuit 46 is turned on and battery power can be supplied from the second battery pack 7 to the motor drive circuit 22. When the discharge permission setting process of S220 ends, the present process moves to S140 (see FIG. 8).

In S140, the CPU 24 executes an A-D conversion process. Specifically, the CPU 24 controls an A-D conversion circuit (not shown) and converts various analog signals inputted to the control circuit 23 to digital values that the CPU 24 can process by the A-D conversion circuit. The CPU 24 acquires the digital values converted by the A-D conversion circuit.

In S150, the CPU 24 executes a failure detection process. Specifically, the CPU 24 executes the aforementioned failure detection function. In other words, the CPU 24 executes the overvoltage detection function based on the voltage signal SV, the overcurrent detection function based on the current signal SC, the first overheat detection function based on the first temperature signal STM1, the second overheat detection function based on the second temperature signal STM2, and the third overheat detection function based on the third temperature signal STM3.

Figure 10:
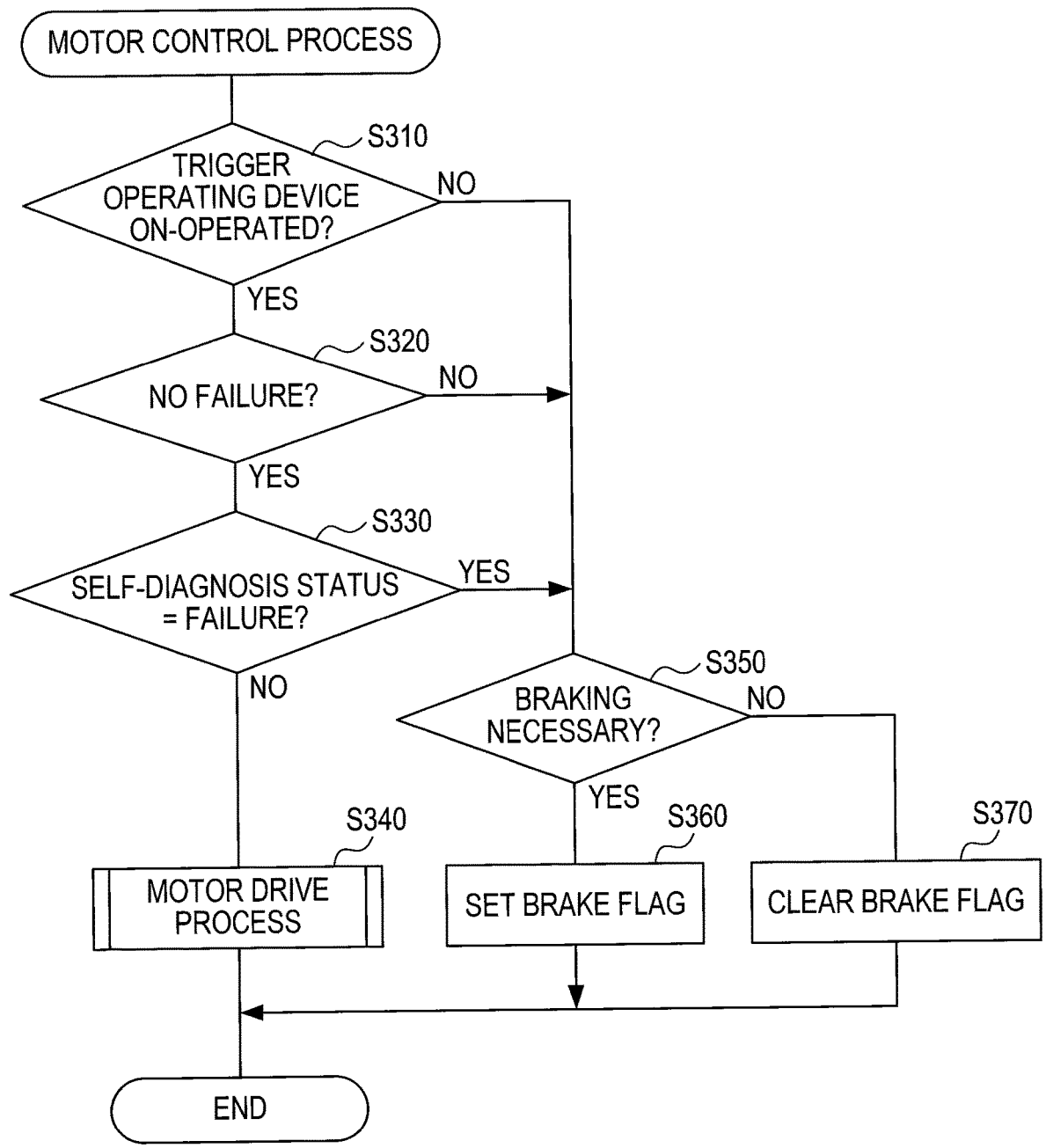
FIG. 10 is a flowchart showing detail of a motor control process of S160.

In S160, the CPU 24 executes a motor control process. Detail of the motor control process is as shown in FIG. 10. The CPU 24, when moving to the motor control process, determines in S310 whether the trigger operating device 20 is on-operated based on the first trigger information ST1 and the second trigger information ST2.

When the trigger operating device 20 is off-operated, the present process moves to S350. When the trigger operating device 20 is on-operated, the present process moves to S320. In S320, the CPU 24 determines whether a failure is detected in one or more of the detection functions in the failure detection process of S150. When a failure is detected in the failure detection process, the present process moves to S350. When no failure is detected in the failure detection process, the CPU 24 further determines whether the interruption information SS indicates the command permission. When the interruption information SS indicates the command permission, the CPU 24 determines that no failure has occurred in the electric working machine 1 and moves to S330. When the interruption information SS indicates the command interruption, the CPU 24 determines that a failure has occurred in the electric working machine 1 and moves to S350.

In S330, the CPU 24 determines whether a later-described self-diagnosis status is set to "failure". When the self-diagnosis status is set to "failure", the present process moves to S350. When the self-diagnosis status is not set to "failure", the present process moves to S340.

In S340, the CPU 24 executes a motor drive process. Specifically, the CPU 24 calculates various parameters. The various parameters are used by the CPU 24 for controlling the motor drive circuit 22 to drive the motor 21. The CPU 24 further outputs the motor drive command SD corresponding to each of the calculated various parameters to the motor drive circuit 22 to drive the motor 21. After the process of S340, the present process moves to S170 (see FIG. 8).

In S350, the CPU 24 determines whether it is necessary to brake the motor 21. Moving to S350 means that it is necessary to stop the motor 21. The process of S350 to S370 is a process to appropriately stop the motor 21.

In S350, the CPU 24, for example, based on a rotation signal inputted from a rotation sensor (not shown), determines whether it is necessary to brake the motor 21. The rotation signal indicates a rotating state of the motor 21. For example, when the motor 21 is rotating above a prescribed speed, it is necessary to brake the motor 21. When it is necessary to brake the motor 21, the present process moves to S360. In S360, the CPU 24 sets a brake flag. This executes braking. Specifically, the CPU 24, in a brake process executed in parallel with the main process separately from the main process, applies braking in response to the set brake flag. After the process of S360, the present process moves to S170.

When it is not necessary to apply braking in S350, the present process moves to S370. For example, when the motor 21 is already stopped, it is not necessary to apply braking. In S370, the CPU 24 clears the brake flag. This stops braking in the aforementioned brake process, in response to the cleared brake flag. After the process of S370, the present process moves to S170. As mentioned above, in the motor control process, when it is determined in S320 that there is no failure, and when the self-diagnosis status is not set to "failure" in S330, the process moves to S340 and the motor drive command SD is outputted. On the other hand, when it is determined in S320 that there is a failure or when the self-diagnosis status is set to "failure" in S330, the motor drive command SD is not outputted and the motor 21 is not driven.

In S170, the CPU 24 executes a display process. Specifically, the CPU 24 displays various information on the display panel 171.

Figure 11:
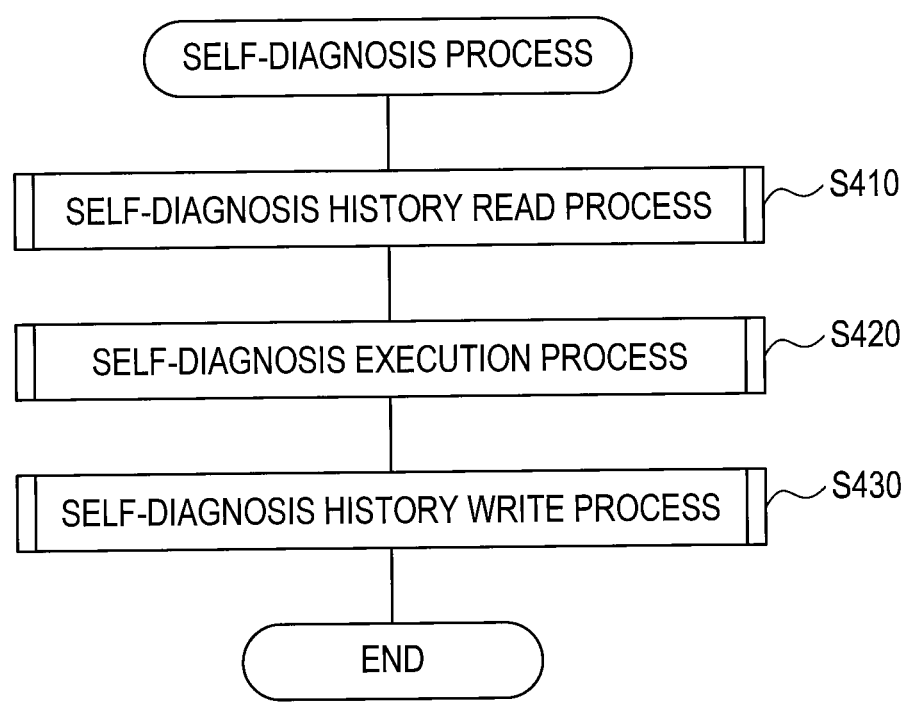
FIG. 11 is a flowchart showing detail of a self-diagnosis process of S180.
Figure 12:
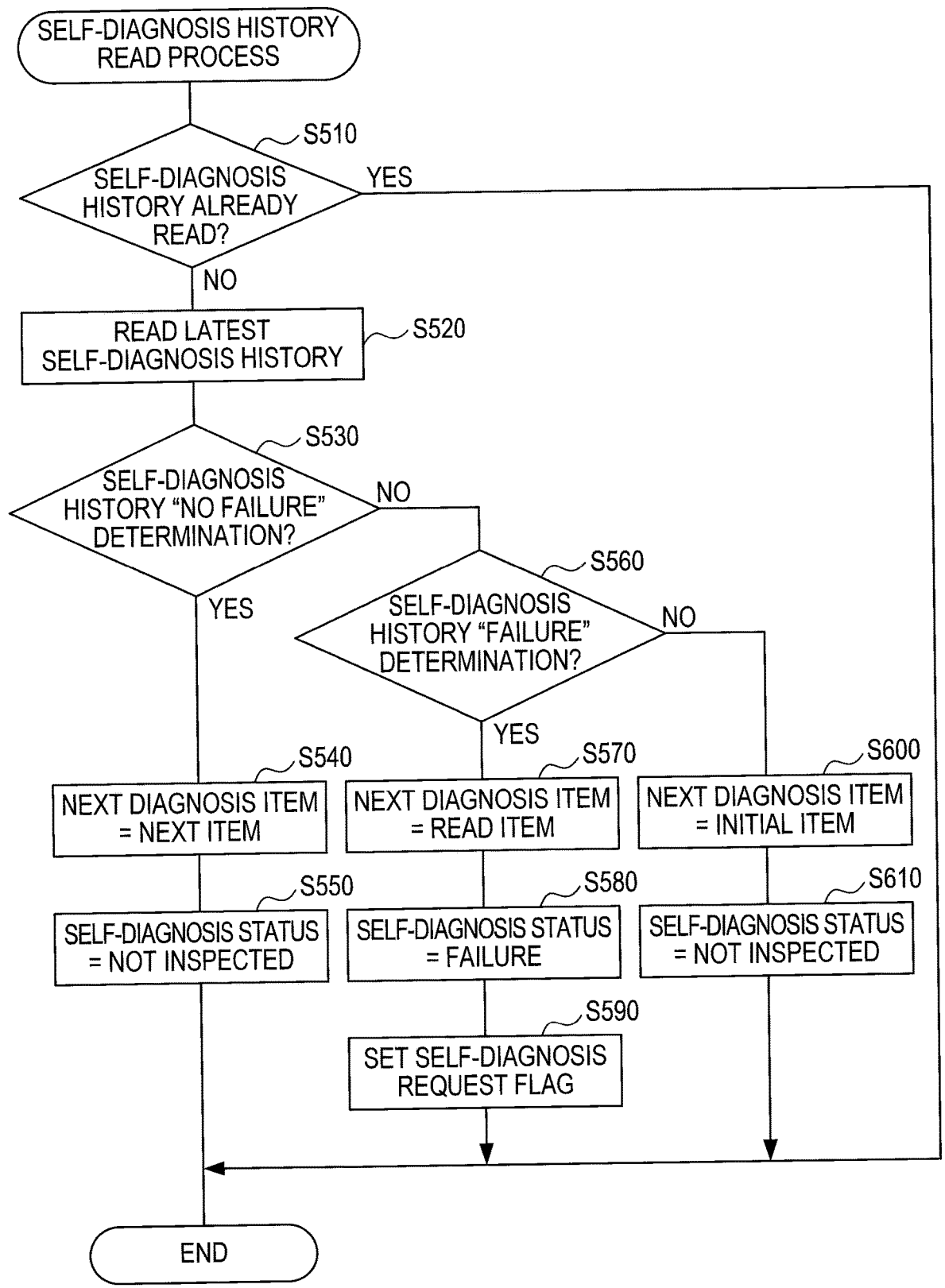
FIG. 12 is a flowchart showing detail of a self-diagnosis history read process of S410.

In S180, the CPU 24 executes a self-diagnosis process. Detail of the self-diagnosis process is as shown in FIG. 11. The CPU 24, when moving to the self-diagnosis process, executes a self-diagnosis history read process in S410. Detail of the self-diagnosis history read process is as shown in FIG. 12.

The CPU 24, when moving to the self-diagnosis history read process, determines in S510 whether the self-diagnosis history most recently written to the memory 25 has already been read. The self-diagnosis history most recently written to the memory 25 indicates the result of the self-diagnosis executed last time. The self-diagnosis history is written to the memory 25 in S830 or SS50 in a later-described self-diagnosis history write process shown in FIG. 14.

In S510, when the self-diagnosis history has already been read, the present process moves to S420 (see FIG. 11). When the self-diagnosis history is not yet read, the present process moves to S520. In S520, the CPU 24 reads the self-diagnosis history written to the memory 25 in the most recent process of S830 or S850 from the memory 25.

In S530, the CPU 24 determines whether the self-diagnosis history read in S520 indicates the "no failure" determination. When the self-diagnosis history read in S520 indicates the "no failure" determination, the present process moves to S540. In S540, the CPU 24 sets the next diagnosis item (that is, diagnosis item of self-diagnosis to be executed this time; in other words, diagnosis item of self-diagnosis to be executed first) to the next diagnosis item of the diagnosis item executed last time in the aforementioned prescribed order. In S550, the CPU 24 sets the self-diagnosis status to "not inspected". After the process of S550, the present process moves to S420 (see FIG. 11). The self-diagnosis status is reset to a prescribed initial value each time the main operation is disabled or enabled.

In S530, when the self-diagnosis history read in S520 is not information indicating the "no failure" determination, the present process moves to S560. In S560, the CPU 24 determines whether the self-diagnosis history read in S520 indicates the "failure" determination. When the self-diagnosis history read in S520 indicates the "failure" determination, the present process moves to S570. In S570, the CPU 24 sets the next diagnosis item to the diagnosis item corresponding to the self-diagnosis history that has been read this time. In other words, the CPU 24 sets the next diagnosis item to the same diagnosis item as that of the self-diagnosis executed last time.

In S580, the CPU 24 sets the self-diagnosis status to "failure". While the self-diagnosis status continues to be set to "failure" after the self-diagnosis status is set to "failure" in S580, it is positively determined in S330 (see FIG. 10) and the motor 21 is not driven.

In S590, the CPU 24 sets a self-diagnosis request flag. The self-diagnosis request flag is cleared each time the main operation is disabled or enabled. After the process of S590, the present process moves to S420 (see FIG. 11).

When the self-diagnosis history read in S560 does not indicate the "failure" determination, the present process moves to S600. In this case, for example, it is assumed that the self-diagnosis history was not properly written at the time of the last self-diagnosis or the self-diagnosis history is not yet written. Thus, in S600, the CPU 24 sets the diagnosis item to an initial (first) diagnosis item in the prescribed order. In S610, the CPU 24 sets the self-diagnosis status to "not inspected". After the process of S610, the present process moves to S420 (see FIG. 11).

Figure 13:
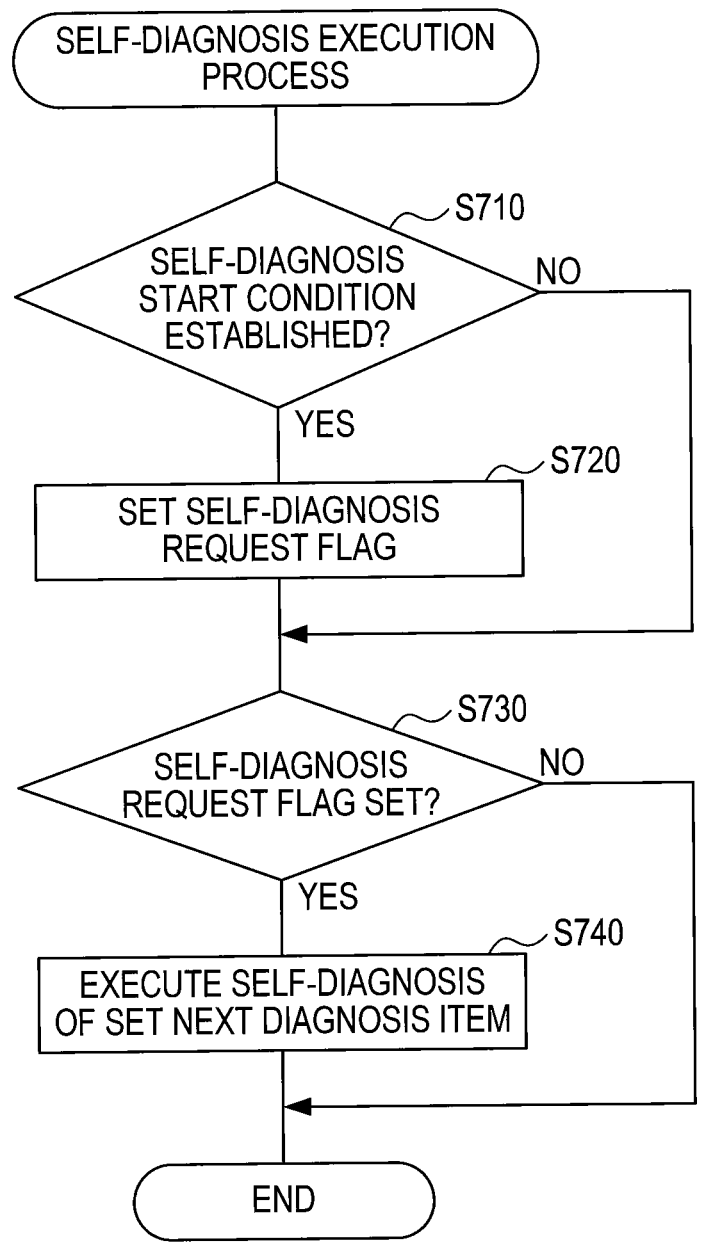
FIG. 13 is a flowchart showing detail of a self-diagnosis execution process of S420.

In S420, the CPU 24 executes a self-diagnosis execution process. Detail of the self-diagnosis execution process is as shown in FIG. 13. The CPU 24, when moving to the self-diagnosis execution process, determines in S710 whether a self-diagnosis start condition is established.

The self-diagnosis start condition differs depending on the prescribed diagnosis timing corresponding to the next diagnosis item. In other words, the self-diagnosis start condition of the diagnosis item of which prescribed diagnosis timing corresponds to the enabling timing (power supply line function diagnosis of the second diagnosis item in the present embodiment) is established when the enabling timing arrives. The main process is started when the main operation is enabled. Therefore, after start of the main process, when the prescribed diagnosis timing corresponding to the next diagnosis item corresponds to the enabling timing, it is determined in S710 that the self-diagnosis start condition is established.

The self-diagnosis start condition of diagnosis item in which the prescribed diagnosis timing corresponds to the disabling timing is established when (i) and (ii) below are satisfied:

(i) the disabling timing has arrived; and (ii) the motor drive command SD is outputted (that is, the motor 21 is driven) during the last enabling period, and the motor 21 is not stopped improperly.

The above (ii) may be determined based on the aforementioned motor drive history and failure drive history.

When the self-diagnosis start condition is not established in S710, the present process moves to S730. When the self-diagnosis start condition is established in S710, the present process moves to S720. In S720, the CPU 24 sets the self-diagnosis request flag.

In S730, the CPU 24 determines whether the self-diagnosis request flag is set. When the self-diagnosis request flag is not set, the present process moves to S430 (see FIG. 11). When the self-diagnosis request flag is set, the present process moves to S740. In S740, self-diagnosis of the next diagnosis item is executed.

The case where self-diagnosis is executed in S740 is basically a case where the self-diagnosis start condition is established for the next diagnosis item in S710, and further the self-diagnosis request flag is set in S720. When the self-diagnosis start condition is not established, self-diagnosis of S740 is not executed. However, when self-diagnosis of the same diagnosis item is executed again this time due to "failure" determination in the last self-diagnosis, the self-diagnosis request flag is set in S590 of FIG. 12. Therefore, in this case, even if the self-diagnosis start condition is not established, it is positively determined in S730, and self-diagnosis is executed in S740. After the self-diagnosis in S740, the present process moves to S430 (see FIG. 11).

Figure 14:
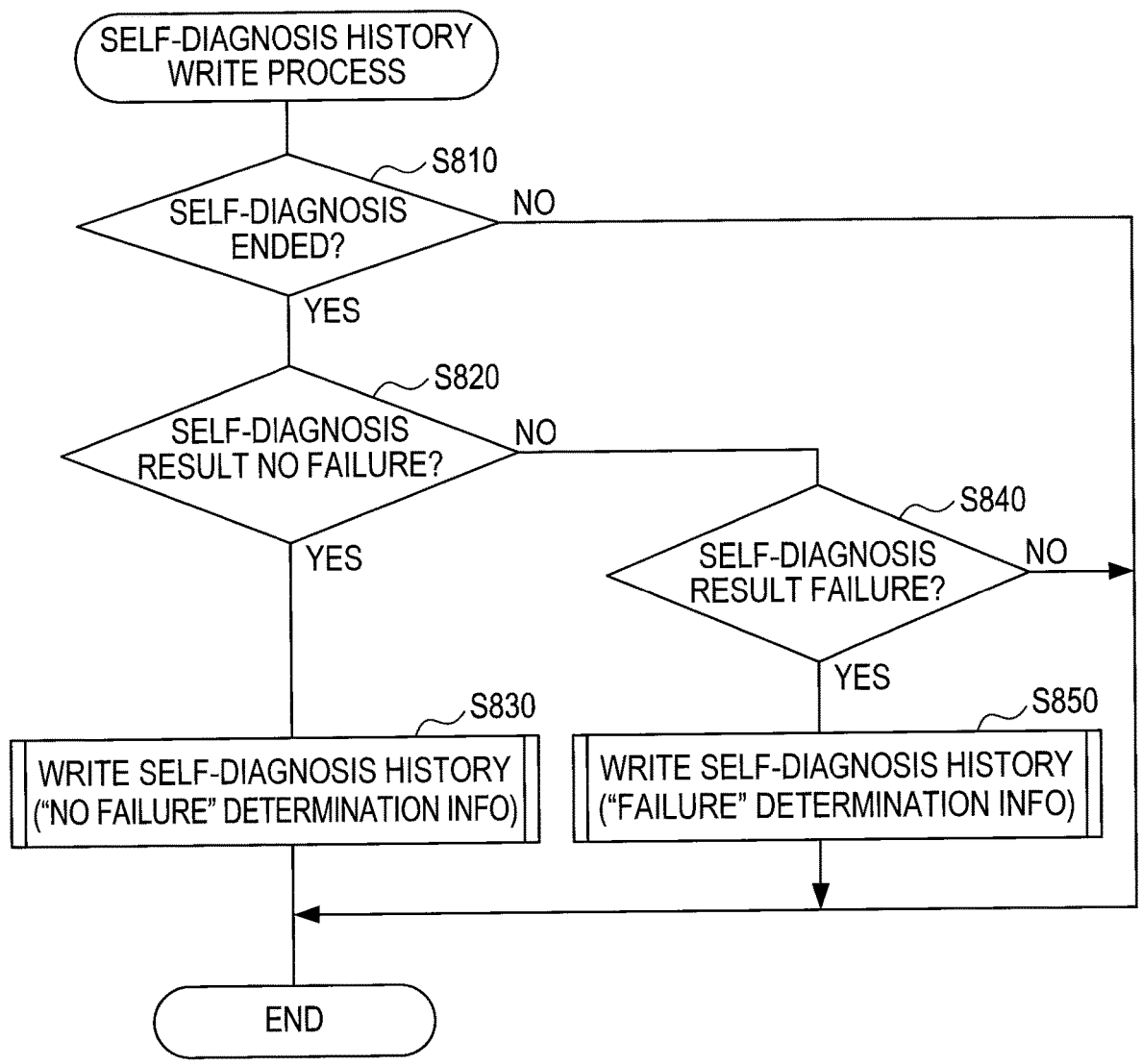
FIG. 14 is a flowchart showing detail of a self-diagnosis history write process of S430.

In S430, the CPU 24 executes a self-diagnosis history write process. Detail of the self-diagnosis history write process is as shown in FIG. 14. The CPU 24, when moving to the self-diagnosis history write process, determines in S810 whether self-diagnosis of the diagnosis item this time has ended. When the self-diagnosis is interrupted for some reason, the CPU 24 ends the self-diagnosis history write process and moves to S110 (see FIG. 8).

When the self-diagnosis of the diagnosis item this time ends in S810, the present process moves to S820. In S820, the CPU 24 determines whether the diagnosis result of self-diagnosis executed this time as no failure. When the diagnosis result has no failure, the CPU 24 writes the self-diagnosis history to the memory 25 in S830. Specifically, the CPU 24 writes information indicating the "no failure" determination. In S830, the CPU 24 further sets the self-diagnosis status to, for example, "inspected". As a result, when the main operation is not disabled at the time when the process of S830 is executed, negative determination is subsequently made in the process of S330, and the motor 21 is driven by the process of S340. After the process of S830, the present process moves to S110 (see FIG. 8).

When the diagnosis result has a failure in S820, the CPU 24 determines in S840 whether the diagnosis result has a failure. When the diagnosis result has no failure, there is a possibility that the diagnosis result has not been acquired correctly for some reason. Therefore, when the diagnosis result has no failure, the CPU 24 moves to S110 (see FIG. 8) without writing the self-diagnosis history.

When the diagnosis result has a failure in S820, the CPU 24 writes the self-diagnosis history to the memory 25 in S850. Specifically, the CPU 24 writes information indicating the "failure" determination. In S850, the CPU 24 further sets the self-diagnosis status to "failure". When the self-diagnosis status is set to "failure" in S850, positive determination is made thereafter in S330 (see FIG. 10) during a condition in which the self-diagnosis status is set to "failure", and the motor 21 is not driven. After the process of S850, the present process moves to S110 (see FIG. 8).

6. Trigger Detection Function Diagnosis Process

Figure 15:
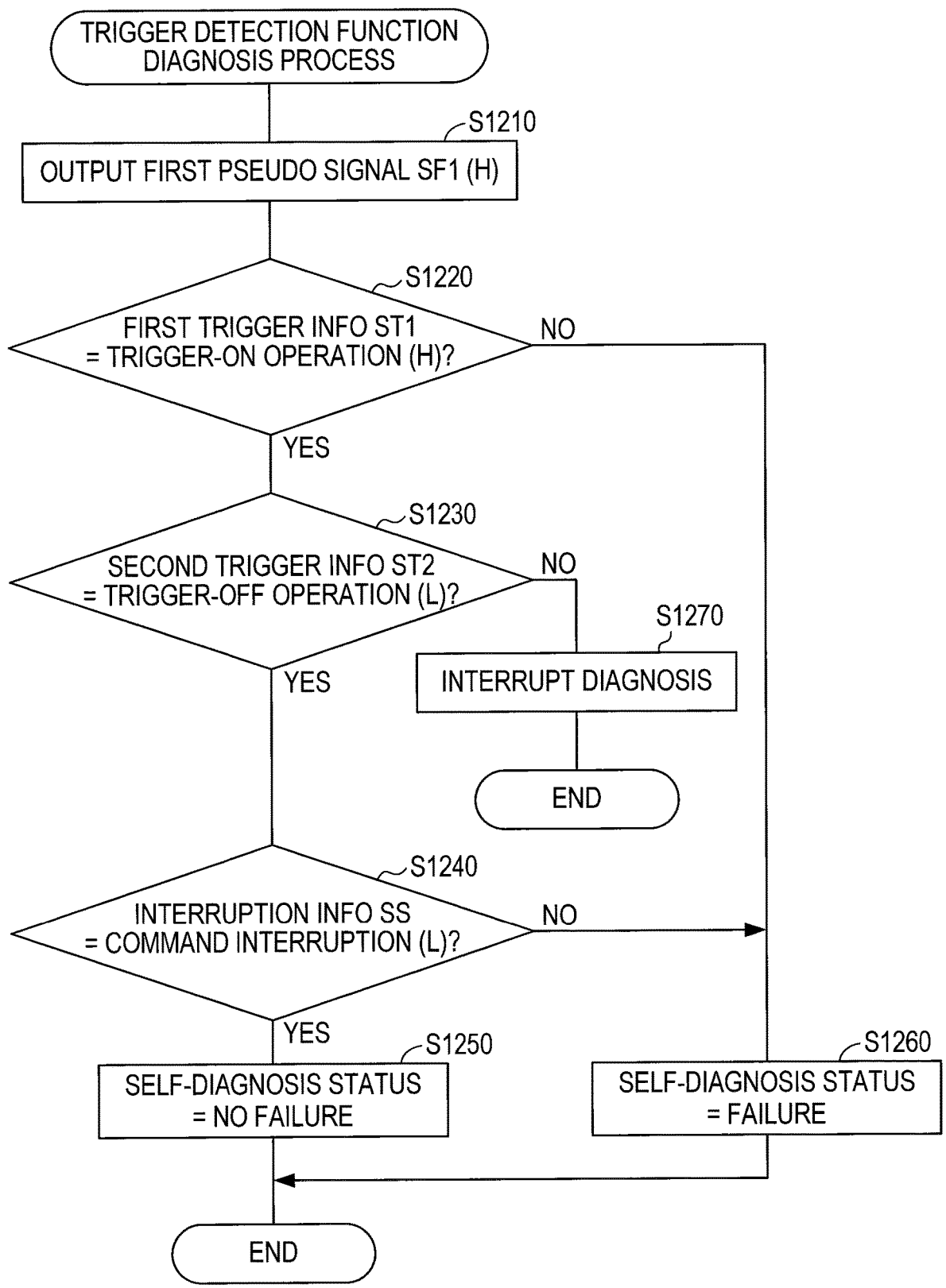
FIG. 15 is a flowchart showing a trigger detection function diagnosis process.

The trigger detection function diagnosis of the first diagnosis item includes the trigger detection function diagnosis process shown in FIG. 15. The CPU 24 executes the trigger detection function diagnosis process shown in FIG. 15 when the next diagnosis item set in S740 of FIG. 13 is the trigger detection function diagnosis.

The CPU 24, when starting the trigger detection function diagnosis process, outputs the first pseudo signal SF1 (high-level binary signal) in S1210. In 81220, the CPU 24 determines whether the first trigger information ST1 indicates the on-operation of trigger operating device 20. When the first trigger information ST1 does not indicate the on-operation of the trigger operating device 20, the CPU 24 executes a process of S1260. In S1260, the CPU 24 determines that the diagnosis result has a failure, sets the self-diagnosis status to "failure", and ends the trigger detection function diagnosis. When the first trigger information ST1 indicates the on-operation of the trigger operating device 20, the present process moves to S1230.

In 81230, the CPU 24 determines whether the second trigger information ST2 indicates the off-operation of the trigger operating device 20. When the second trigger information ST2 does not indicate the off-operation of the trigger operating device 20, there is a possibility that a failure has occurred to the trigger detection circuit 80 or the user is operating the trigger operating device 20. Therefore, when the second trigger information ST2 does not indicate the off-operation of the trigger operating device 20, the CPU 24 interrupts the currently running trigger detection function diagnosis of the first diagnosis item in S1270.

When the second trigger information ST2 indicates the off-operation of the trigger operating device 20 in S1230, the present process moves to S1240. In S1240, the CPU 24 determines whether the interruption information SS indicates the command interruption. When the interruption information SS does not indicate the command interruption, that is, indicates the command permission, the present process moves to S1260. In S1260, the CPU 24 determines that the diagnosis result has a failure, and sets the self-diagnosis status to "failure". When the interruption information SS indicates the command interruption, the present process moves to S1250. In S1250, the CPU 24 determines that the diagnosis result has no failure, sets the self-diagnosis status to "no failure", and ends the trigger detection function diagnosis process.

7. Regular Check of Trigger Detection Function

Figure 16:
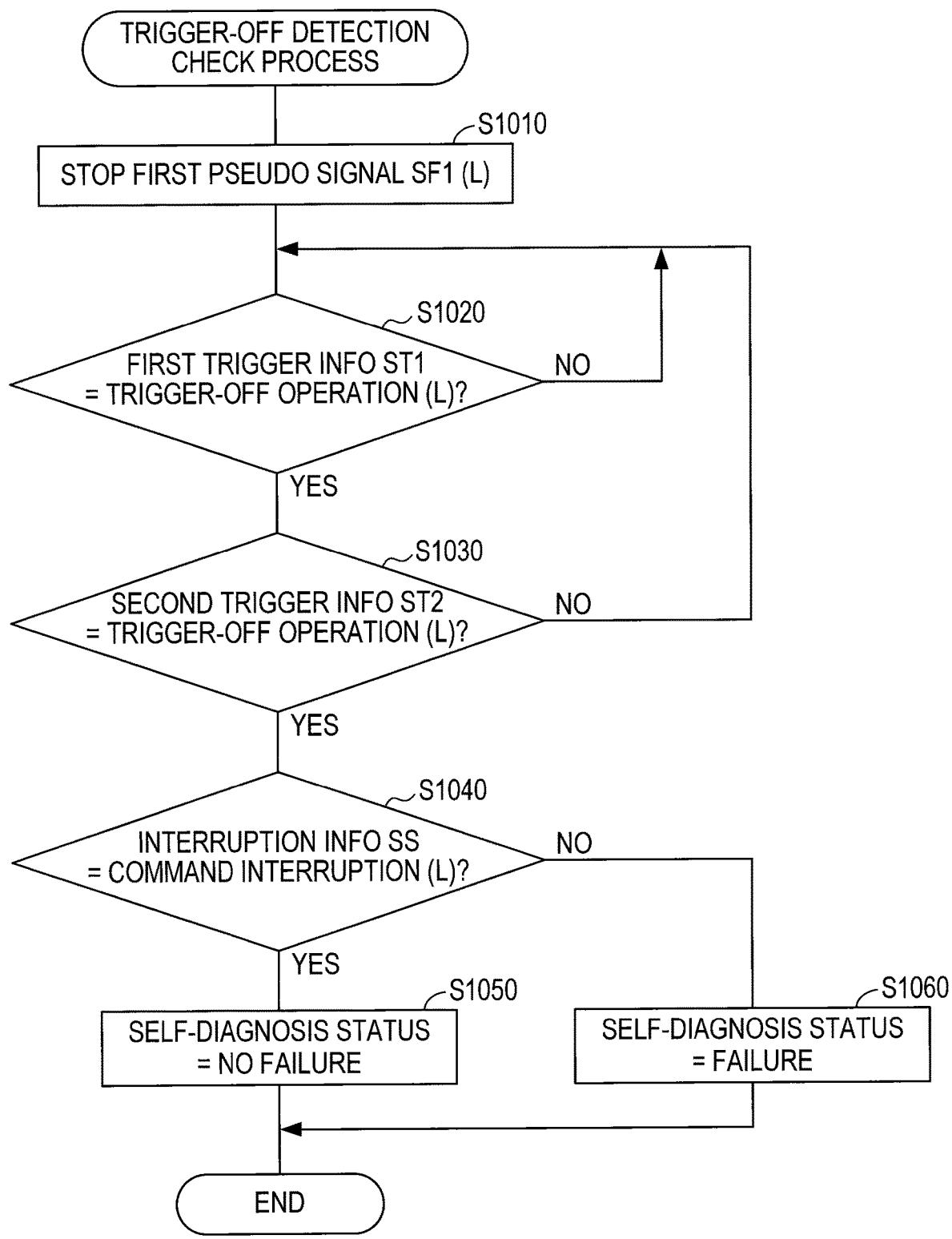
FIG. 16 is a flowchart showing a trigger-off detection check process.
Figure 17:
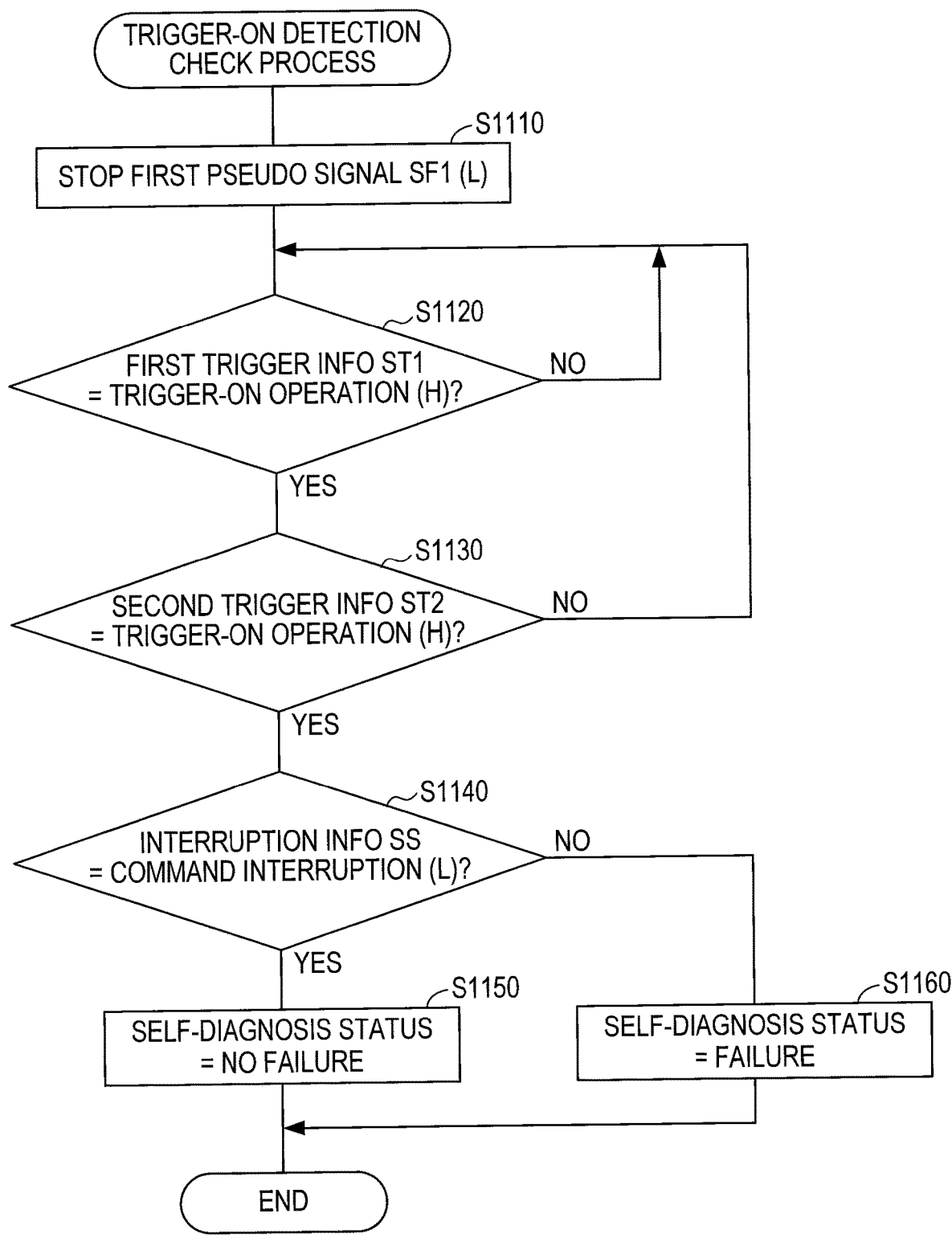
FIG. 17 is a flowchart showing a trigger-on detection check process.

The control circuit 23 (specifically, CPU 24) of the present embodiment, in parallel with the aforementioned main process, executes a trigger-off detection check process shown in FIG. 16 and trigger-on detection check process shown in FIG. 17.

The trigger-off detection check process confirms whether it is possible to properly recognize that the trigger operating device 20 is off-operated based on the first trigger information ST1 and the second trigger information ST2.

The trigger-on detection check process confirms whether it is possible to properly recognize that the trigger operating device 20 is on-operated based on the first trigger information ST1 and the second trigger information ST2.

The trigger-off detection check process may be included in the aforementioned main process. For example, in the main process of FIG. 8, the control circuit 23, after start of the main process, may perform the trigger-off detection check process first and then move to S110.

The trigger-on detection check process may be included in the aforementioned main process. For example, in the motor control process of FIG. 10, the control circuit 23 may perform the trigger-on detection check process before the process of S330.

7-1) Trigger-Off Detection Check Process

The control circuit 23 executes the trigger-off detection check process shown in FIG. 16, for example, each time the main operation is enabled and immediately after enabled. The control circuit 23, when starting the trigger-off detection check process, stops outputting the first pseudo signal SF1 in S1010. Basically, the first pseudo signal SF1 is not outputted immediately after the main operation is enabled. Therefore, the process of S1010 is essentially a process for maintaining a state where the first pseudo signal SF1 is not outputted.

In S1020, the control circuit 23 determines whether the first trigger information ST1 indicates the off-operation of the trigger operating device 20. When the first trigger information ST1 does not indicate the off-operation of the trigger operating device 20, there is a possibility that the main power switch 30 is turned on in a state that the trigger operating device 20 is on-operated. Therefore, when the first trigger information ST1 does not indicate the off-operation of the trigger operating device 20, the control circuit 23 repeats the process of S1020 until the first trigger information ST1 indicates the off-operation of the trigger operating device 20.

When the first trigger information ST1 indicates the off-operation of the trigger operating device 20 in S1020, the present process moves to S1030. In S1030, the control circuit 23 determines whether the second trigger information ST2 indicates the off-operation of the trigger operating device 20. When the second trigger information ST2 does not indicate the off-operation of the trigger operating device 20, the present process moves to S1020. When the second trigger information ST2 indicates the off-operation of the trigger operating device 20, the present process moves to S1040.

The process of S1040 to S1060 is the same as the process of the aforementioned S1240 to S1260 in FIG. 15. In other words, the control circuit 23, when the interruption information SS does not indicate the command interruption, sets the self-diagnosis status to "failure" in S1060. The control circuit 23, when the interruption information SS indicates the command interruption, sets the self-diagnosis status to "no failure" in S1050.

7-2) Trigger-on Detection Check Process

The control circuit 23 executes the trigger-on detection check process shown in FIG. 17, for example, when recognizing the on-operation of the trigger operating device 20 based on the first trigger information ST1 and the second trigger information ST2.

The control circuit 23, when starting the trigger-on detection check process, stops outputting the pseudo signal SF1 in S1110, similar to the case of S1010 of FIG. 16. In S1120, the control circuit 23 determines whether the first trigger information ST1 indicates the on-operation of the trigger operating device 2. When first trigger information ST1 does not indicate the on-operation of the trigger operating device 20, the control circuit 23 repeats the process of S1120 until the first trigger information ST1 indicates the on-operation of the trigger operating device 20.

When the first trigger information ST1 indicates the on-operation of the trigger operating device 20 in S1120, the present process moves to S1130. In S1130, the control circuit 23 determines whether the second trigger information ST2 indicates the on-operation of the trigger operating device 20. When the second trigger information ST2 does not indicate the on-operation of the trigger operating device 20, the present process moves to S1120. When the second trigger information ST2 indicates the on-operation of the trigger operating device 20, the present process moves to S1140.

In S1140, the control circuit 23 determines whether the interruption information SS indicates the command permission. When the interruption information SS does not indicate the command permission, that is, indicates the command interruption, the present process moves to S1160. In S1160, the control circuit 23 sets the self-diagnosis status to "failure". When the interruption information SS indicates the command permission, the present process moves to S150. In S81150, the control circuit 23 sets the self-diagnosis status to "no failure".

8. Effect of Embodiment

According to the above-described embodiment, the following effects (a) to (h) are produced.

(a) In the electric working machine 1 of the present embodiment, each time the main operation is enabled, one of six types of self-diagnoses according to the prescribed order is executed at the diagnosis timing during the enabling period until the disabling timing. Basically, self-diagnosis of the diagnosis item different from the diagnosis item executed last time is executed. Therefore, the six types of self-diagnoses can be efficiently performed.

(b) In the present embodiment, the diagnosis item is switched not merely according to the prescribed order. When the self-diagnosis result has a failure, self-diagnosis of the same diagnosis item is executed again in the next enabling period. Therefore, reliability of the electric working machine 1 can be improved.

(c) Moreover, when self-diagnosis has a failure, self-diagnosis of the same diagnosis item is repeated for each enabling period until the diagnosis result for the same diagnosis item has no failure. Therefore, the electric working machine 1 can continuously recognize the failure while the failure is occurring. This allows appropriate measures to be taken, for example, not to drive the motor 21 while the failure is occurring.

(d) When self-diagnosis has a failure, the control circuit 23 executes self-diagnosis of the same diagnosis item at the beginning of the next enabling period, that is, when the main operation is enabled. Therefore, rediagnosis of the diagnosis item diagnosed as having a failure can be executed at appropriate timing. Reliability of the electric working machine 1 can be further improved.

(e) In the present embodiment, the diagnosis timing during the enabling period is set according to the diagnosis item. Specifically, the diagnosis timing of the second diagnosis item corresponds to the enabling timing, and the diagnosis timings of the other diagnosis items correspond to the disabling timing. As such, since the diagnosis timing is set for each diagnosis item, self-diagnosis of each diagnosis item can be executed at a more appropriate timing.

(f) When the motor 21 is not driven during the last enabling period, the control circuit 23 does not execute self-diagnosis at the disabling timing. As such, since self-diagnosis is not executed when the motor 21 is not driven, self-diagnosis can be efficiently performed.

(g) When the self-diagnosis result executed at the enabling timing has a failure, the control circuit 23 does not drive the motor 21 during the enabling period including the enabling timing. Therefore, driving of the motor 21 is suppressed while a failure is occurring. Reliability of the electric working machine 1 can be improved.

(h) The electric working machine 1 of the present embodiment has the functions achieved by at least one of the circuits subject to diagnosis of the first to six diagnosis items. The electric working machine 1 is provided with a dual system, corresponding to each of the functions, that suppresses malfunction of the functions.

For example, the electric working machine 1 has a motor drive function to drive the motor 21 in response to the on-operation of the trigger operating device 20. The electric working machine 1 is provided with a first dual system corresponding to this motor drive function. The first dual system suppresses unintended rotation of the motor 21.

More specifically, the first dual system corresponding to the motor drive function includes a first motor driving system and a second motor driving system. The motor 21, when both the first motor driving system and the second motor driving system operate properly, is properly driven or stopped. The first motor driving system includes a system from the trigger switch 26 to the drive line 90 via the trigger detection circuit 80 and the control circuit 23. In other words, in the first motor driving system, the motor drive command SD is outputted from the control circuit 23, in response to the on-operation of the trigger operating device 20. The second motor driving system includes a system from the trigger switch 26 to the interruption switch 29 via the trigger detection circuit 80 and the interruption latch circuit 70. In other words, in the second motor driving system, the interruption information SS indicating the command permission is outputted from the interruption latch circuit 70 to the interruption switch 29, in response to the on-operation of the trigger operating device 20.

In the first motor driving system, for example, assume a situation where the motor drive command SD is erroneously outputted from the control circuit 23 although the trigger operating device 20 is not on-operated. In this case, if the second motor driving system operates properly, the interruption switch 29 is turned off when the trigger operating device 20 is not on-operated, and the motor 21 is not driven. Conversely, in the second motor driving system, for example, assume a situation where the interruption switch 29 is turned on even if the trigger operating device 20 is not on-operated. In this case, if the first motor driving system operates properly, the motor drive command SD is not outputted from the control circuit 23 when the trigger operating device 20 is not on-operated, and thus the motor 21 is not driven.

Also, for example, the electric working machine 1 has a first switching function that completes or interrupts the first power supply line 91 by the first switching circuit 36. The electric working machine 1 is provided with a second dual system corresponding to the first switching function. The second dual system suppresses erroneous turning-on of the switch 37 of the first switching circuit 36.

More specifically, the second dual system corresponding to the first switching function includes a first on permission system and a second on permission system. The switch 37 of the first switching circuit 36 is properly turned on when both the first on permission system and the second on permission system operate properly. The first on permission system includes a system in which the control circuit 23 outputs the third discharge permission signal SA3 to turn on the switch 37 in response to the control circuit 23 receiving the first discharge permission signal SA1. More specifically, the control circuit 23 outputs the third discharge permission signal SA3 in response to receiving the first discharge permission signal SA1 and the second off detection signal SB2. The second on permission system includes a system in which the first discharge permission signal SA1 is inputted to the first switching circuit 36 without intervention of the control circuit 23.

In the first on permission system, for example, assume a situation where the third discharge permission signal SA3 is outputted from the control circuit 23 even if the control circuit 23 does not receive the first discharge permission signal SA1. In this case, if the second on permission system operates properly, the switch 37 is not turned on since low-level signal is inputted from the battery failure detection circuit 12 to the AND circuit 38. This interrupts supply of electric power from the battery 11 to the motor 21, and the motor 21 is not driven by electric power of the battery 11.

Conversely, in the second on permission system, for example, assume a situation where the input terminal of the first discharge permission signal SA1 in the AND circuit 38 becomes high level even if the first discharge permission signal SA1 is not inputted from the battery failure detection circuit 12 to the electric working machine 1. In this case, if the first on permission system operates properly, the switch 37 is not turned on since the control circuit 23 does not output the third discharge permission signal SA3.

The electric working machine 1 has a second switching function to complete or interrupt the second power supply line 92 by the second switching circuit 46. The electric working machine 1 has a third dual system corresponding to the second switching function. The third dual system suppresses erroneous turning-on of the switch 47 of the second switching circuit 46. For example, assume a situation where the fourth discharge permission signal SA4 is outputted from the control circuit 23 although the control circuit 23 does not receive the second discharge permission signal SA2. In this case, if low-level signal is properly inputted from the battery failure detection circuit 17 to the AND circuit 48, the switch 47 is not turned on. This interrupts supply of electric power from the battery 16 to the motor 21, and the motor 21 is not driven by electric power of the battery 16.

The electric working machine 1 further has a fourth dual system corresponding to the first switching function. The fourth dual system suppress erroneous turning-on of the switch 37 of the first switching circuit 36.

Specifically, the fourth dual system includes a third on permission system and a fourth on permission system. The switch 37 is properly turned on when both the third on permission system and the fourth on permission system operate properly. The third on permission system includes a system in which the control circuit 23 outputs the third discharge permission signal SA3 to turn on the switch 37 in response to the control circuit 23 receiving the second off detection signal SB2. More specifically, the control circuit 23 outputs the third discharge permission signal SA3 in response to receiving the second off detection signal SB2 and the first discharge permission signal SA1. The fourth on permission system includes a system in which the second off detection signal SB2 is inputted to the first switching circuit 36 without intervention of the control circuit 23.

In the third on permission system, for example, assume a situation where the third discharge permission signal SA3 is outputted from the control circuit 23 although the second off detection signal SB2 is not outputted to the control circuit 23. In this case, if the fourth on permission system operates properly, the switch 37 is not turned on. Conversely, in the fourth on permission, for example, assume a situation where the input terminal of the second off detection signal SB2 in the AND circuit 38 becomes high level although the second off detection signal SB2 is not outputted from the second off detection circuit 49. In this case, if the third on permission system operates properly, the switch 37 is not turned on since the control circuit 23 does not output the third discharge permission signal SA3.

Also, for example, the electric working machine 1 has an overvoltage protection function by the overvoltage detection circuit 50. The electric working machine 1 includes a fifth dual system corresponding to this overvoltage protection function. The fifth dual system properly stops the motor 21 when the overvoltage state is generated. More specifically, the fifth dual system corresponding to the overvoltage protection function includes a first overvoltage protection system and a second overvoltage protection system. The first overvoltage protection system includes a system in which the interruption latch circuit 70 turns off the interruption switch 29 in response to the overvoltage signal So1. The second overvoltage protection system includes a system in which the control circuit 23 stops the motor drive command SD in response to the control circuit 23 detecting generation of the overvoltage state based on the voltage signal SV.

Also, for example, the electric working machine 1 has an overcurrent protection function by the current detection circuit 55. The electric working machine 1 includes a sixth dual system corresponding to this overcurrent protection function. The sixth dual system properly stops the motor 21 when the overcurrent state is generated. More specifically, the sixth dual system corresponding to the overcurrent protection function includes a first overcurrent protection system and a second overcurrent protection system. The first overcurrent protection system includes a system in which the interruption latch circuit 70 turns off the interruption switch 29 in response to the overcurrent signal So2. The second overcurrent protection function includes a system in which the control circuit 23 stops the motor drive command SD in response to the control circuit 23 detecting generation of the overcurrent state based on the current signal SC.

Also, for example, the electric working machine 1 includes a first overheat protection function by the first overheat detection circuit 61. The electric working machine 1 includes a seventh dual system corresponding to the first overheat protection function. The seventh dual system properly stops the motor 21 when the U-phase overheated state is generated. More specifically, the seventh dual system corresponding to the first overheat protection function includes a first overheat protection system and a second overheat protection system. The first overheat protection system includes a system in which the interruption latch circuit 70 turns off the interruption switch 29 in response to the first overheat signal So31. The second overheat protection system includes a system in which the control circuit 23 stops the motor drive command SD in response to the control circuit 23 detecting generation of the U-phase overheated state based on the first temperature signal STM1.

In each of the second overheat protection function by the second overheat detection circuit 62 and the third overheat protection function by the third overheat detection circuit 63 as well, two protection systems are built in the same manner as for the first overheat protection function.

In the present embodiment, the first switching circuit 36, the second switching circuit 46, the overvoltage detection circuit 50, the overheat detector 60, the interruption latch circuit 70 and the trigger detection circuit 80 correspond to one example of circuits in the present disclosure. The trigger detection function diagnosis, the power supply line function diagnosis, the first overheat protection function diagnosis, the second overheat protection function diagnosis, the third overheat protection function diagnosis and the overvoltage protection function diagnosis correspond to one example of diagnoses in the present disclosure. The state where the main operation is enabled corresponds to one example of a first state in the present disclosure. The state where the main operation is disabled corresponds to one example of a second state in the present disclosure. The operation of the main power switch 30 for enabling the main operation corresponds to one example of an operation of the second switch for setting the control circuit to a first state in the present disclosure. The operation of the main power switch 30 for disabling the main operation corresponds to one example of an operation of the second switch for setting the control circuit to a second state in the present disclosure. The enabling period corresponds to one example of a specific period in the present disclosure. Each of the enabling timing and the disabling timing corresponds to one example of a first diagnosis timing, a second diagnosis timing, a first timing, and a second timing in the present disclosure. The enabling timing further corresponds to one example of a third timing in the present disclosure. The trigger operating device 20 corresponds to one example of a first switch in the present disclosure. The main power switch 30 corresponds to one example of a second switch in the present disclosure.

OTHER EMBODIMENTS

The embodiment of the present disclosure has been described in the above. The present disclosure is not limited to the above-described embodiment and can be variously modified.

(1) The prescribed order may be any order. Each diagnosis item may be associated with weighting. In that case, the prescribed order may be determined based on the weighting. More specifically, the prescribed order may be determined so that the larger the weighting of the diagnosis item is, the higher the execution frequency is.

Figures 18A, 18B:
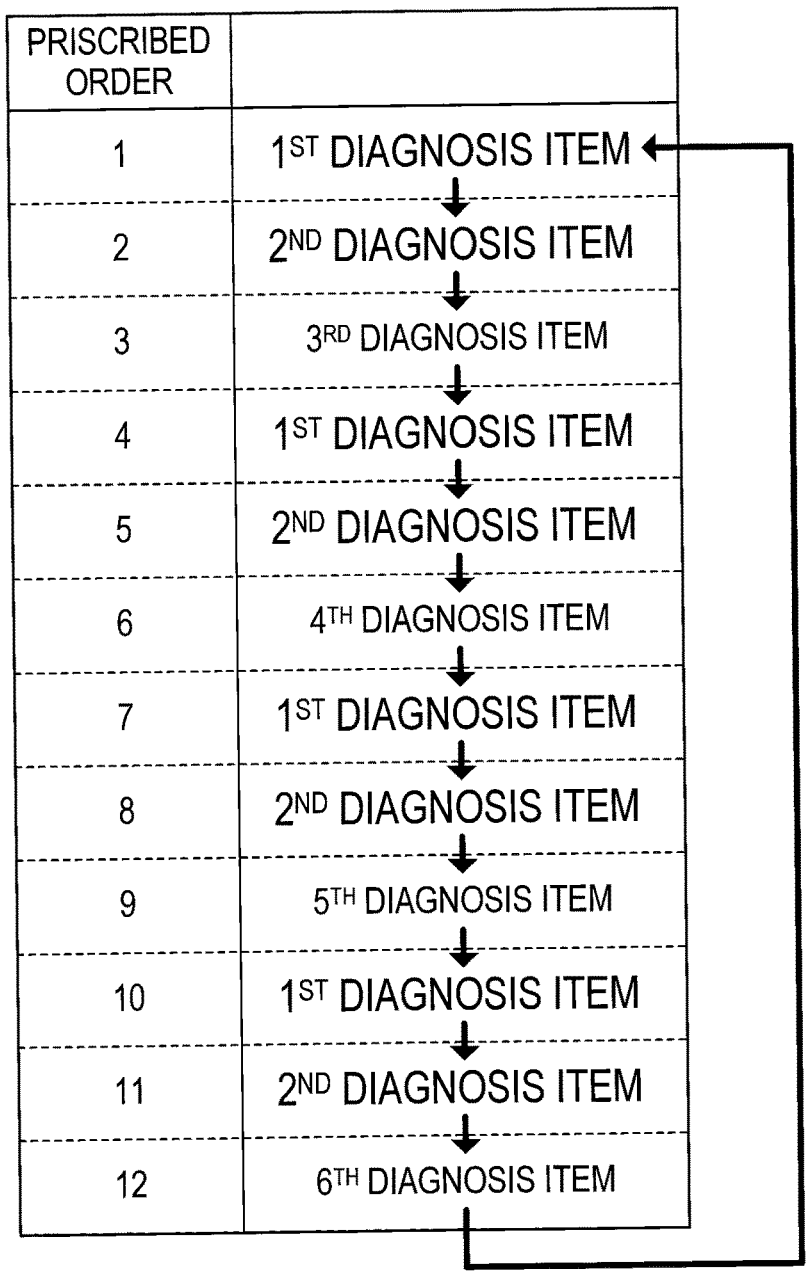
FIG. 18A shows an example of priorities set for each diagnosis item.
FIG. 18B is an example of a prescribed order that reflects the priorities.

For example, as shown in FIG. 18A, the first diagnosis item and the second diagnosis item may have higher priority (that is, have greater weighting) than the third to sixth diagnosis items. In this case, the prescribed order may be determined as illustrated in FIG. 18B. In the prescribed order shown in FIG. 18B, it is determined that self-diagnoses of two diagnosis items having greater weighting are frequently executed, and self-diagnoses of the other four diagnosis items are executed less frequently.

(2) In the prescribed order, at least one of the six diagnosis items may be arranged successively. Multiple diagnosis items may be assigned to one and the same order. In other words, multiple diagnosis items may be executed sequentially or in parallel at one diagnosis timing.

(3) Execution order of self-diagnosis is not limited to the prescribed order, and may be any order. For example, the execution order may be determined randomly. Specifically, for example, the electric working machine 1 may include a random number generator, and the random number generator may determine the next diagnosis item based on the generated random number.

(4) Self-diagnosis of the diagnosis item of which diagnosis timing corresponds to the disabling timing may be executed even if the motor 21 is not driven during the last enabling period. Self-diagnosis of the diagnosis item of which diagnosis timing corresponds to the disabling timing may be executed even if driving of the motor 21 is stopped due to detection of a failure in the last enabling period.

(5) The first trigger switch 27 and the second trigger switch 28 may be a normally closed switch or a normally open switch. In this case, for example, the NOT circuit 85 may be eliminated.

(6) The overvoltage detection circuit 50, the current detection circuit 55, the overheat detector 60, the interruption latch circuit 70 and the trigger detection circuit 80 may have different circuit configurations than those shown in FIGS. 2 and 3.

(7) The electric working machine 1 may have a self-diagnosis function of the current detection circuit 55. Specifically, the control circuit 23 may have a function to output a sixth pseudo signal for generating a pseudo overcurrent state to the current detection circuit 55. The current detection circuit 55 may be configured to turn the current signal SC into a signal indicating the overcurrent state when receiving the sixth pseudo signal. The configuration as such allows the control circuit 23 to diagnose whether the current detection circuit 55 properly operates based on the current signal SC when the sixth pseudo signal is outputted.

Figure 19:
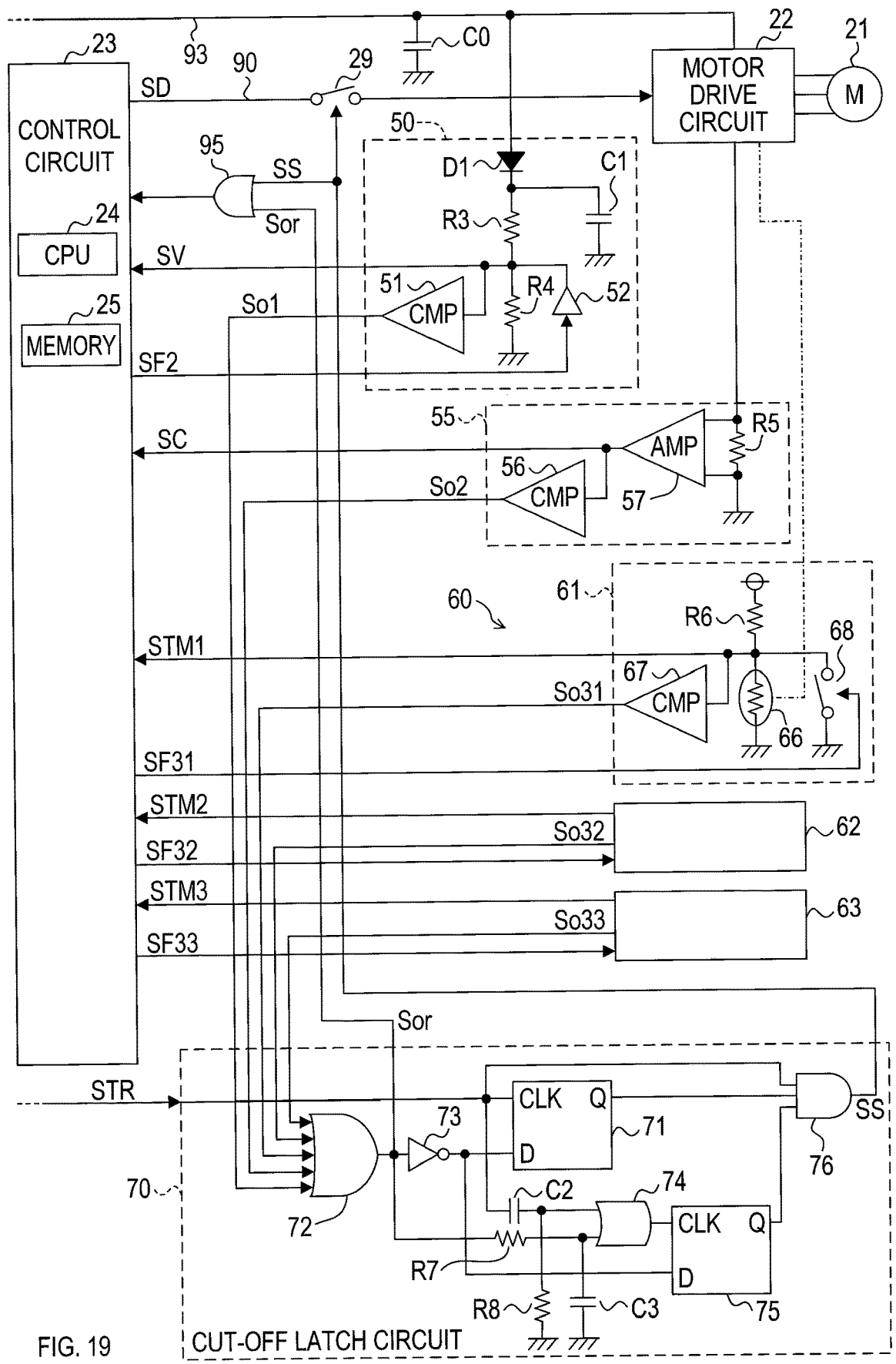
FIG. 19 is an explanatory diagram showing further another example of the electrical configuration of the electric working machine.

(8) In the above-described embodiment, the interruption information SS and the failure detection information Sor are individually inputted to the control circuit 23. As shown in FIG. 19, a logical sum of the interruption information SS and the failure detection information Sor may be inputted to the control circuit 23. Specifically, as shown in FIG. 19, the electric working machine 1 may include an OR circuit 95. This OR circuit 95 may receive the interruption information SS and the failure detection information Sor. The control circuit 23 may receive an output signal of the OR circuit 95 instead of receiving the interrupt signal SS and the failure detection information Sor.

(9) The motor of the present disclosure may be different from a brushless motor. The electric working machine of the present disclosure is not limited to an electric working machine driven by battery power, and may be an electric working machine that receives alternating current (AC) power and is driven by the AC power.

(10) The technique of the present disclosure may be applied to various electric working machines, such as electric working machines for gardening other than bush/grass cutters and electric power tools for masonry work, metalworking, or woodworking. More specifically, the present disclosure may be applied to various electric working machines such as, for example, electric hammers, electric hammer drills, electric drills, electric drivers, electric wrenches, electric grinders, electric circular saws, electric reciprocating saws, electric jig saws, electric cutters, electric chain saws, electric planers, electric nailers (including tackers), electric hedge trimmers, electric lawn mowers, electric bush/grass trimmers, electric weed wackers, electric cleaners, electric blowers, electric sprayers, electric spreaders, electric dust collectors, and so on.

(11) Functions of one component in the aforementioned embodiment may be achieved by two or more components, and a function of one component may be achieved by two or more components. Functions of two or more components may be achieved by one component, and a function achieved by two or more components may be achieved by one component. A part of the aforementioned embodiment may be omitted. At least a part of the configuration of the aforementioned embodiment may be added to or replaced with the configuration of the other embodiments.

What is claimed is:

1. An electric working machine comprising:
a battery;
a motor;
a motor drive circuit configured to receive electric power from the battery, the motor drive circuit including a U-PHASE switch pair, a V-PHASE switch pair, and a W-PHASE switch pair connected in parallel to each other, the motor drive circuit being configured to convert the electric power into a three-phase power to supply the three-phase power to the motor;
a power supply line configured to supply the electric power of the battery to the motor drive circuit;
a rotary blade configured to by rotated by the motor;
a trigger configured to be on-operated or off-operated by a user of the electric working machine;
a trigger detection circuit configured to detect on-operation of the trigger by the user;
a switching circuit configured to complete or interrupt the power supply line depending on a state of the battery;
a first overheat detection circuit configured to detect a temperature of the U-PHASE switch pair, the first overheat detection circuit being configured to detect a U-PHASE overheated state base on the temperature of the U-PHASE switch pair;
a second overheat detection circuit configured to detect a temperature of the V-PHASE switch pair, the second overheat detection circuit being configured to detect a V-PHASE overheated state based on the temperature of the V-PHASE switch pair;
a third overheat detection circuit configured to detect a temperature of the W-PHASE switch pair, the third overheat detection circuit being configured to detect a W-PHASE overheated state based on the temperature of the W-PHASE switch pair;

an overvoltage detection circuit configured to detect a voltage of the battery, the overvoltage detection circuit being configured to detect an overvoltage state of the battery based on the voltage of the battery; and a control circuit configured to:
  drive the motor via the motor drive circuit in response to the trigger detection circuit detecting the on-operation of the trigger; and
  execute, in a following order at a corresponding diagnosis timing, each of:
    a trigger detection function diagnosis including diagnosing the trigger detection circuit;
    a line function diagnosis including diagnosing the switching circuit;
    a first overheat protection function diagnosis including diagnosing the first overheat detection circuit;
    a second overheat protection function diagnosis including diagnosing the second overheat detection circuit;
    a third overheat protection function diagnosis including diagnosing the third overheat detection circuit; and
    an overvoltage protection function diagnosis including diagnosing the overvoltage detection circuit.

2. An electric working machine comprising:
two or more circuits at least including a first circuit and a second circuit; and
a control circuit configured to:
  execute two or more diagnoses at least including a first diagnosis and a second diagnosis one by one in order, the first diagnosis diagnosing the first circuit, the second diagnosis diagnosing the second circuit;
  execute the first diagnosis or the second diagnosis at a first diagnosis timing; and
  execute the first diagnosis or the second diagnosis at a second diagnosis timing, and the second diagnosis timing following the first diagnosis timing.

3. The electric working machine according to claim 2, wherein the control circuit is configured to execute the diagnoses one by one according to a prescribed order, and
wherein the prescribed order is determined so that the first diagnosis is executed at the first diagnosis timing and the second diagnosis is executed at the second diagnosis timing.

4. The electric working machine according to claim 3, wherein each of the diagnoses is associated with weighting, and
wherein the prescribed order is determined according to the weighting.

5. The electric working machine according to claim 4, wherein the weighting associated with the first diagnosis is greater than the weighting set to the second diagnosis, and
wherein the prescribed order is determined that execution frequency of the first diagnosis is higher than execution frequency of the second diagnosis based on the weighting set to the first diagnosis and the weighting set to the second diagnosis.

6. The electric working machine according to claim 2, wherein the control circuit is configured to execute the first diagnosis at the first diagnosis timing; and
wherein the control circuit is configured to again execute the first diagnosis at the second diagnosis timing in response to the first diagnosis indicating that the first circuit is in a faulty state.

7. The electric working machine according to claim 2, further comprising:
a manipulator configured such that a first operation is performed by a user of the electric machine,
wherein the first diagnosis timing corresponds to a first timing, the first timing is included in a first specific period, and the first specific period starts in response to the user performing the first operation, and
wherein the second diagnosis timing corresponds to the second timing, the second timing is included in a second specific period, and the second specific period starts in response to the user performing the first operation for the first time after an end of the first specific period.

8. The electric working machine according to claim 7, wherein the control circuit is configured to execute the first diagnosis at the first diagnosis timing, and
wherein the control circuit is configured to again execute the first diagnosis at the second diagnosis timing in response to the first diagnosis indicating that the first circuit is in a faulty state, the second diagnosis timing corresponds to a third timing, the third timing being included in the second specific period, and the third timing is the same as or different from the second timing.

9. The electric working machine according to claim 8, wherein the first timing corresponds to a timing after a start of the first specific period, and
wherein the third timing corresponds to a start of the second specific period.

10. The electric working machine according to claim 7, wherein the first timing corresponds to the end of the first specific period.

11. The electric working machine according to claim 10, further comprising:
a motor,
wherein the control circuit is configured not to execute the first diagnosis at the first diagnosis timing in response to the motor being not driven during the first specific period.

12. The electric working machine according to claim 7, further comprising:
a motor,
wherein the manipulator includes:
  a first switch configured to be operated by the user, and
  a second switch provided separately from the first switch, the second switch being configured to be operated by the user,
wherein the control circuit is configured to set the control circuit to a first state or a second state in response to operation of the second switch,
wherein the control circuit set to the first state is configured to drive the motor in response to operation of the first switch,
wherein the control circuit set to the second state is configured not to drive the motor even if the first switch is operated, and
wherein the first operation includes the second switch being operated so that the control circuit is set to the first state.

13. The electric working machine according to claim 12, wherein the first specific period and the second specific period end in response to the control circuit being set to the second state.

14. The electric working machine according to claim 12, wherein the first specific period and the second specific period end in response to elapse of a prescribed time without the first switch being operated after the control circuit is set to the first state.

15. The electric working machine according to claim 7,
wherein the control circuit is configured to execute the first diagnosis at the first diagnosis timing,
wherein the first timing corresponds to a timing before the end of the first specific period, and
wherein the control circuit is configured not to drive the motor from when the first diagnosis indicates that the first circuit is in a faulty state until the end of the first specific period.

16. The electric working machine according to claim 2,
wherein the first circuit is configured to receive a first signal,
the second circuit is configured to receive a second signal, and
the control circuit is configured to:
  output the first signal to the first circuit in the first diagnosis, the first diagnosis diagnosing the first circuit based on an operation of the first circuit in response to the first signal, and
  output the second signal to the second circuit in the second diagnosis, the second diagnosis diagnosing the second circuit based on an operation of the second circuit in response to the second signal.

* * * * *